(12) United States Patent
Li et al.

(10) Patent No.: US 11,327,236 B2
(45) Date of Patent: May 10, 2022

(54) GRATING-COUPLED LIGHT GUIDE, DISPLAY SYSTEM, AND METHOD EMPLOYING OPTICAL CONCENTRATION

(71) Applicant: LEIA INC., Menlo Park, CA (US)

(72) Inventors: Xuejian Li, Menlo Park, CA (US); David A. Fattal, Mountain View, CA (US); Francesco Aieta, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/822,795

(22) Filed: Mar. 18, 2020

(65) Prior Publication Data
US 2020/0218011 A1    Jul. 9, 2020

Related U.S. Application Data

(63) Continuation of application No. PCT/US2017/054153, filed on Sep. 28, 2017.

(51) Int. Cl.
*G02B 6/293* (2006.01)
*F21V 8/00* (2006.01)

(52) U.S. Cl.
CPC ............ *G02B 6/293* (2013.01); *G02B 6/003* (2013.01); *G02B 6/0016* (2013.01); *G02B 6/0043* (2013.01)

(58) Field of Classification Search
None
See application file for complete search history.

(56) References Cited

U.S. PATENT DOCUMENTS

| 5,810,469 A | 9/1998 | Weinreich |
| 6,196,691 B1 | 3/2001 | Ochiai |

(Continued)

FOREIGN PATENT DOCUMENTS

| JP | S62-203122 A | 9/1987 |
| JP | H05-232519 A | 9/1993 |

(Continued)

OTHER PUBLICATIONS

International Search Report and Written Opinion (ISRWO) by International Searching Authority (ISA) Korean Intellectual Property Office (KIPO), dated Jun. 28, 2018 (14 pages) for counterpart parent PCT Application No. PCT/US2017/054153.

(Continued)

*Primary Examiner* — Omar R Rojas
(74) *Attorney, Agent, or Firm* — J. Michael Johnson

(57) ABSTRACT

A grating-coupled light guide concentrates light and diffractively redirects the concentrated light at a non-zero propagation angle as guided light having a predetermined spread angle. The grating-coupled light guide includes a light guide, an optical concentrator, and a grating coupler. The optical concentrator is configured to concentrate light from a light source as concentrated light and the grating coupler is configured to diffractively redirect the concentrated light into the light guide as the guided light. Characteristics of the optical concentrator and grating coupler are configured in combination to determine the non-zero propagation angle and predetermined spread angle. A grating-coupled display system further includes an array of light valves configured to modulate emitted light as a displayed image.

19 Claims, 13 Drawing Sheets

(56) References Cited

U.S. PATENT DOCUMENTS

| | | | |
|---|---|---|---|
| 6,580,529 B1 | 6/2003 | Amitai et al. | |
| 7,751,662 B2 | 7/2010 | Kleemann | |
| 8,049,710 B2 | 11/2011 | Shestak et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 2004/0013361 A1* | 1/2004 | Chen | G02B 6/29358 385/31 |
| 2005/0041174 A1 | 2/2005 | Numata et al. | |
| 2005/0140832 A1 | 6/2005 | Goldman et al. | |
| 2006/0191177 A1 | 8/2006 | Engel | |
| 2007/0081360 A1* | 4/2007 | Bailey | G02B 6/0021 362/621 |
| 2007/0129864 A1 | 6/2007 | Tanaka et al. | |
| 2007/0201234 A1 | 8/2007 | Ottermann | |
| 2007/0298533 A1 | 12/2007 | Yang et al. | |
| 2008/0204663 A1 | 8/2008 | Balogh | |
| 2008/0225393 A1 | 9/2008 | Rinko | |
| 2009/0244706 A1 | 10/2009 | Levola et al. | |
| 2010/0039832 A1 | 2/2010 | Ahlgren et al. | |
| 2010/0302803 A1 | 12/2010 | Bita et al. | |
| 2011/0002143 A1 | 1/2011 | Saarikko et al. | |
| 2011/0141395 A1 | 6/2011 | Yashiro | |
| 2012/0113678 A1 | 5/2012 | Cornelissen et al. | |
| 2012/0188791 A1 | 7/2012 | Voloschenko | |
| 2013/0265802 A1 | 10/2013 | Kamikatano et al. | |
| 2015/0205034 A1 | 7/2015 | Faecke et al. | |
| 2016/0033784 A1 | 2/2016 | Levola et al. | |
| 2016/0132025 A1 | 5/2016 | Taff et al. | |
| 2016/0212417 A1 | 7/2016 | Ng et al. | |
| 2016/0231567 A1 | 8/2016 | Saarikko et al. | |
| 2017/0085867 A1 | 3/2017 | Baran et al. | |
| 2017/0090096 A1 | 3/2017 | Fattal | |
| 2017/0192244 A1 | 7/2017 | Shinohara et al. | |
| 2017/0248747 A1 | 8/2017 | Kim et al. | |
| 2017/0299793 A1 | 10/2017 | Fattal | |
| 2017/0299794 A1 | 10/2017 | Fattal | |
| 2017/0363794 A1 | 12/2017 | Wan et al. | |
| 2018/0024289 A1 | 1/2018 | Fattal | |
| 2018/0052276 A1* | 2/2018 | Klienman | G02C 5/16 |
| 2018/0188691 A1 | 7/2018 | Fattal | |
| 2018/0278923 A1 | 9/2018 | Fattal | |
| 2018/0321500 A1 | 11/2018 | Chen et al. | |
| 2019/0025494 A1 | 1/2019 | Fattal et al. | |
| 2019/0317265 A1 | 10/2019 | Fattal et al. | |
| 2020/0033619 A1 | 1/2020 | Fattal et al. | |

FOREIGN PATENT DOCUMENTS

| | | | | |
|---|---|---|---|---|
| JP | H06-082612 A | 3/1994 | | |
| JP | H06-332354 A | 12/1994 | | |
| JP | H07-162026 A | 6/1995 | | |
| JP | H11-133255 A | 5/1999 | | |
| JP | 2000267041 A | 9/2000 | | |
| JP | 2001175197 A | 6/2001 | | |
| JP | 2004302186 A | 10/2004 | | |
| JP | 2002031788 A | 2/2012 | | |
| JP | 2012022085 A | 2/2012 | | |
| KR | 20130017886 A | 2/2013 | | |
| WO | 2014051623 A1 | 4/2014 | | |
| WO | 2016111707 A1 | 7/2016 | | |
| WO | 2017039750 A1 | 3/2017 | | |
| WO | WO-2017041073 A1 * | 3/2017 | ......... | G02B 27/0093 |
| WO | 2017131807 A1 | 8/2017 | | |
| WO | 2019066819 A1 | 4/2019 | | |
| WO | 2019168538 A1 | 9/2019 | | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Chun-Wei Liu, et al. , Sub-wavelength gratings fabricated on a light bar by roll-to-roll UV embossing process, Optics Express, Jun. 6, 2011, pp. 11299-11311, vol. 19, No. 12.

Extended European Search Report (EESR) from the European Patent Office dated Mar. 26, 2021 (3 pages) for the foreign counterpart application No. 17926984.0 to the counterpart parent PCT Application PCT/US2017/054153 for the present U.S. Appl. No. 16/822,795.

* cited by examiner

GRATING-COUPLED LIGHT GUIDE, DISPLAY SYSTEM, AND METHOD EMPLOYING OPTICAL CONCENTRATION

CROSS-REFERENCE TO RELATED APPLICATIONS

This application claims priority to International Patent Application No. PCT/US2017/054153, filed Sep. 28, 2017, which is incorporated by reference in its entirety herein.

STATEMENT REGARDING FEDERALLY SPONSORED RESEARCH OR DEVELOPMENT

N/A

BACKGROUND

Plate light guides, also referred to as slab optical waveguides, are used in a variety of optical and photonic applications. For example, a plate light guide may be employed in a backlight of an electronic display. In particular, the plate light guide may be used to distribute light to pixels of the electronic display. The pixels may be multiview pixels of a multiview display or two-dimensional (2D) pixels of a 2D display, for example. In another example, the plate light guide may be employed as a touch-sensitive panel. Frustrated total internal reflection associated with touching a surface of the plate light guide may be used to detect where and with how much pressure the plate light guide is touched, for example.

In various optical and photonic applications of a plate light guide, light from a light source must be introduced or coupled into the plate light guide to propagate as guided light. Further, in many applications, light introduction or coupling is configured to provide guided light within plate light guide having certain predetermined propagation characteristics. For example, the guided light produced by the light coupling may propagate with a particular or predetermined propagation angle and in a particular or predetermined propagation direction. Further, the guided light or a beam thereof may have a predetermined spread angle(s). For example, the guided light may be a substantially collimated beam of light propagating from an input edge to an output edge of the plate light guide. In addition, the beam of guided light may travel within the plate light guide at a predetermined propagation angle relative to a plane of the plate light guide such that the light beam effectively 'bounces' between a front surface and back surface of the plate light guide.

Among the various light couplers for introducing or coupling light from a light source into a plate light guide are lenses, baffles, mirrors and various related reflectors (e.g., parabolic reflectors, shaped reflectors, etc.) as well as combinations thereof. Unfortunately using such light couplers often requires exacting manufacturing operations to produce and precisely realize the light coupler such that the desired propagation characteristics of the guided light are obtained. Further, the light coupler manufacturing is often separate from the production of the plate light guide. As a further complication, these separately manufactured light couplers typically must be precisely aligned with and then affixed to the plate light guide to provide the desired light coupling that results in added cost and manufacturing complexity.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide light concentration and diffractive coupling of light into a light guide. In particular, light is coupled into the plate light guide using a combination of an optical concentrator and a grating coupler that includes a diffraction grating. Further, the light is coupled in a manner that may transform substantially uncollimated light into guided light within the light guide having predetermined propagation characteristics, according to various examples. For example, the guided light may have a predetermined propagation angle within the light guide. In addition, the guided light within the light guide may have a predetermined spread angle. For example, both of a horizontal spread angle (e.g., parallel to a surface of the plate light guide) of the guided light and a vertical spread angle (e.g., orthogonal to the plate light guide surface) of the guided light may be about zero such that the guided light is a collimated light beam. In another example, guided light having one or both of the horizontal spread angle and the vertical spread angle corresponding to a fan-shaped beam pattern (e.g., a beam having about a thirty degree spread angle to more than about a ninety degree spread angle) may be provided within the light guide.

The coupling of light into a light guide (e.g., a grating-coupled light guide), according to various embodiments of the principles described herein, may be useful in a variety of applications including, but not limited to, a backlight of an electronic display (e.g., a multiview display). Uses of electronic displays employing various embodiments according to the principles described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 1A:
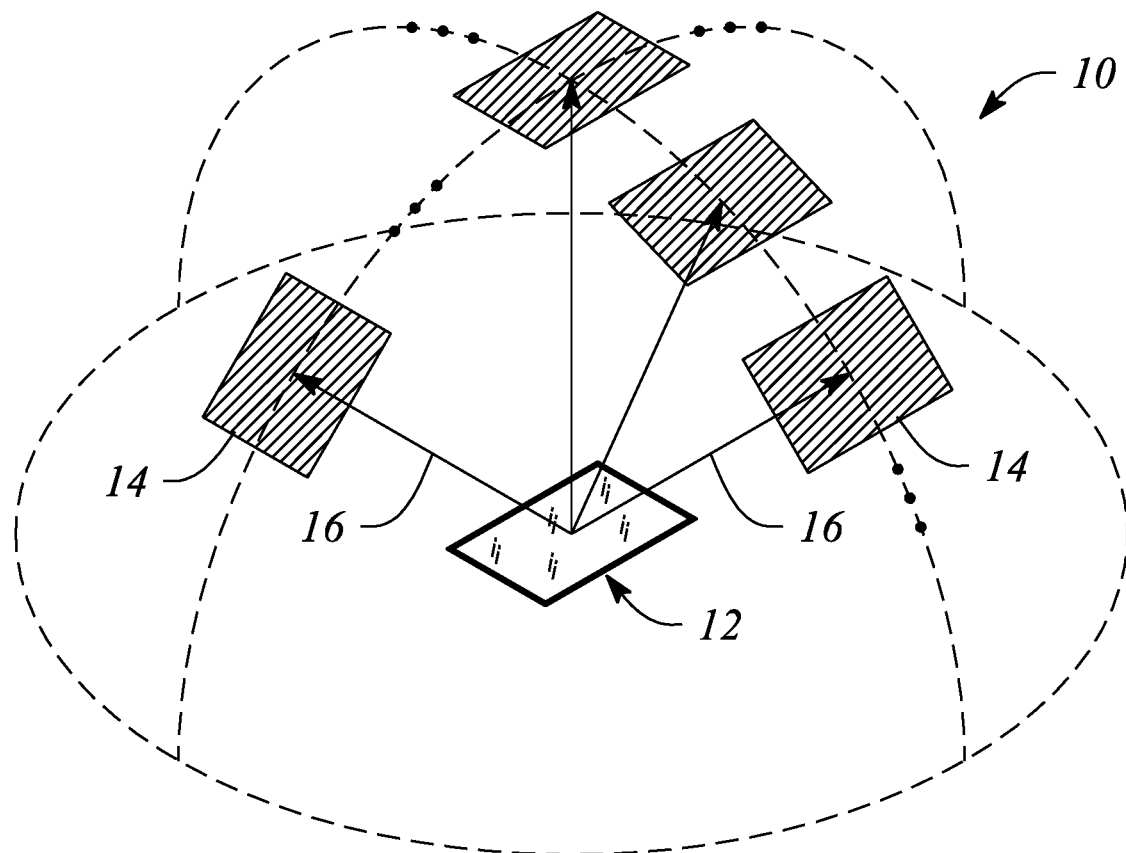
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions (or simply different directions); the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
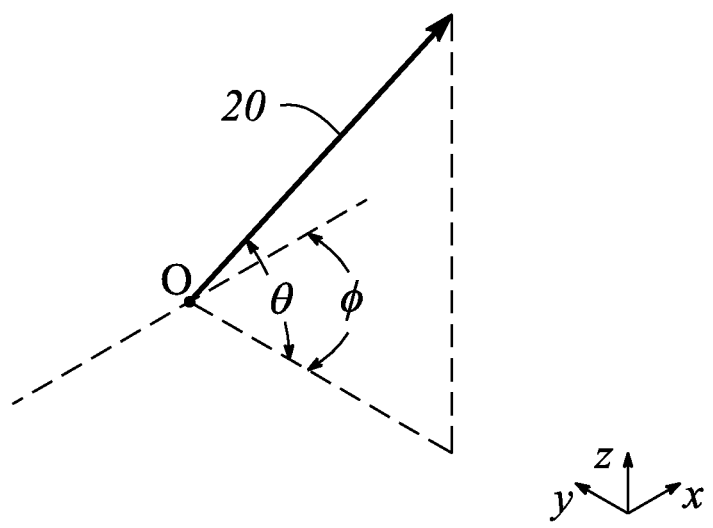
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction or 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

According to various embodiments described herein, a grating coupler is used to couple light into the light guide. The grating coupler, by definition herein, includes a diffraction grating in which characteristics and the features thereof (i.e., 'diffractive features') may be used to control one or both of an angular directionality and an angular spread of a light beam produced by the diffraction grating from incident light. The characteristics that may be used to control the angular directionality and the angular spread include, but are not limited to, one or more of a grating length, a grating pitch (feature spacing), a shape of the diffractive features (e.g., sinusoidal, rectangular, triangular, sawtooth, etc.), a size of the diffractive features (e.g., groove or ridge width), and an orientation of the grating. In some examples, the various characteristics used for control may be characteristics that are local to a vicinity of a point of origin of the produced light beam as well as a point or points of incidence of the light on the diffraction grating.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
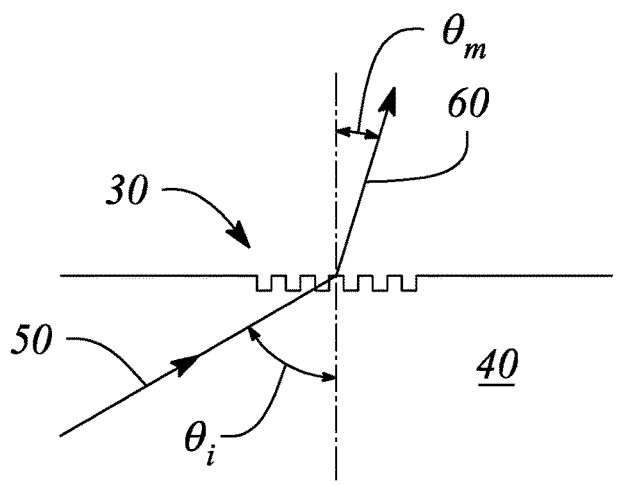
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s=f(\sigma)$). In some embodiments, the angular spread $\sigma_s$ of the scattered light is a linear function of the angular spread or collimation factor $\sigma$ of the incident light (e.g., $\sigma_s=a\cdot\sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or reflector as well as a general diffuser (e.g., having or approximating Lambertian scattering) are not angle-preserving scatterers, by definition herein.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling out a portion of light guided in the light guide. In other embodiments, the multibeam element may generate light emitted as the light beams (e.g., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/− $\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 3A:
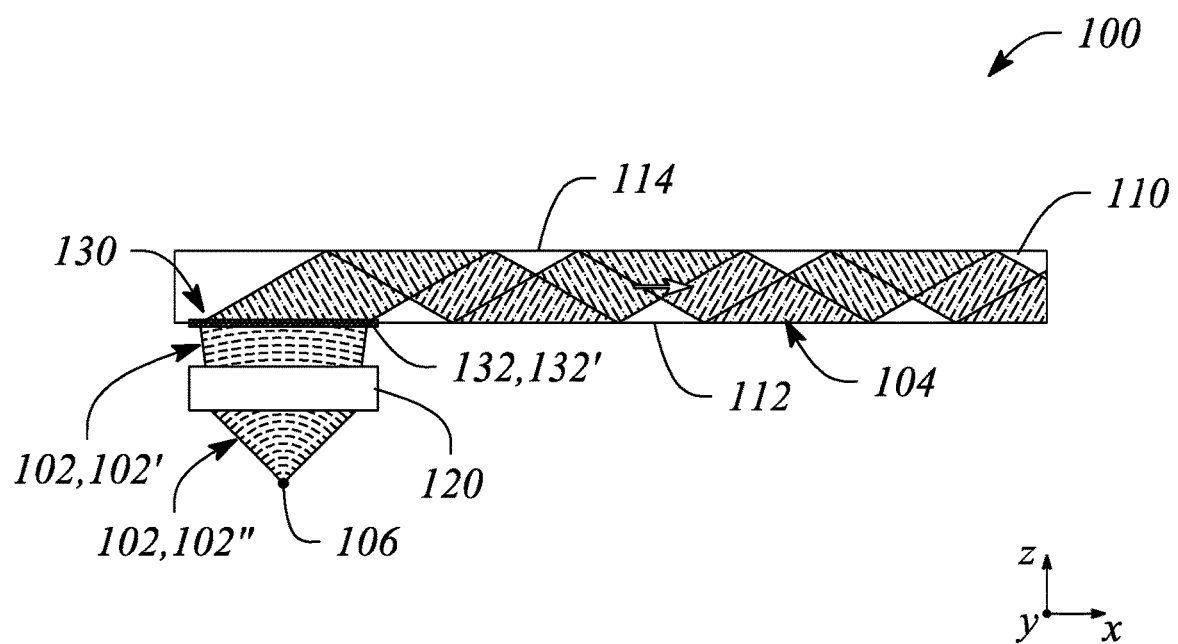
FIG. 3A illustrates a cross sectional view of a grating-coupled light guide in an example, according to an embodiment consistent with the principles described herein.
Figure 3B:
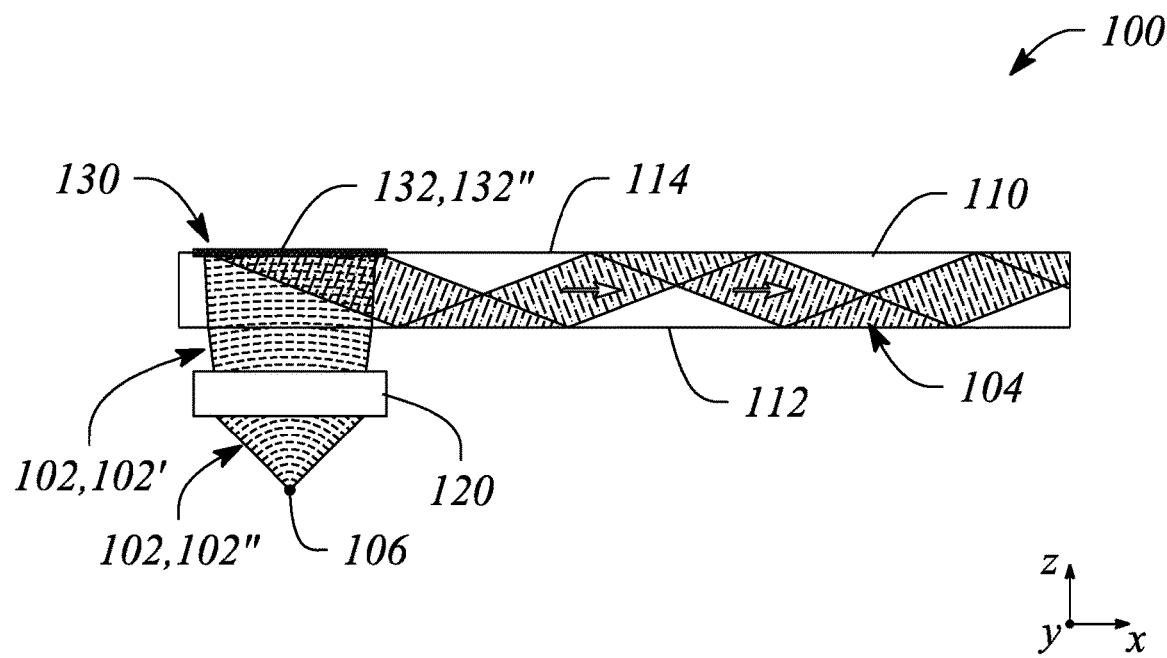
FIG. 3B illustrates a cross sectional view of a grating-coupled light guide, according to another example consistent with the principles described herein.

In accordance with some examples of the principles described herein, a grating-coupled light guide is provided. FIG. 3A illustrates a cross sectional view of a grating-coupled light guide 100 in an example, according to an embodiment consistent with the principles described herein. FIG. 3B illustrates a cross sectional view of a grating-coupled light guide 100 in an example, according to another embodiment consistent with the principles described herein. The grating-coupled light guide 100 is configured to receive and diffractively couple light 102 into the grating-coupled light guide 100 as guided light 104. For example, the light 102 may be provided by a light source 106 (e.g. a substantially uncollimated light source), as described in more detail below. According to various examples, the grating-coupled light guide 100 may provide a relatively high coupling efficiency. Moreover, the grating-coupled light guide 100 may transform the light 102 received from the light source 106 into guided light 104 (e.g., a beam of guided light) having a predetermined spread angle or collimation factor $\sigma$ within the grating-coupled light guide 100, according to various embodiments.

In particular, a coupling efficiency of greater than about twenty percent (20%) may be achieved, according to some embodiments. For example, in a transmission configuration (described below), the coupling efficiency of the grating-coupled light guide 100 may be greater than about thirty percent (30%) or even greater than about thirty-five percent (35%). A coupling efficiency of up to about forty percent (40%) may be achieved, for example. In a reflection configuration, the coupling efficiency of the grating-coupled light guide 100 may be as high as about fifty percent (50%), or about sixty percent (60%) or even about seventy percent (70%), for example.

According to various embodiments, the predetermined spread angle or collimation factor $\sigma$ provided by and within the grating-coupled light guide 100 may yield a beam of guided light 104 having controlled or predetermined propagation characteristics. In particular, the grating-coupled light guide 100 may provide a controlled or predetermined first spread angle in a 'vertical' direction, i.e., in a plane perpendicular to a plane of a surface of the grating-coupled light guide 100. Simultaneously, the grating-coupled light guide 100 may provide a controlled or predetermined second spread angle in a horizontal direction, i.e., in a plane parallel to the grating-coupled light guide surface. Further, the light 102 may be received from the light source 106 at an angle that is substantially perpendicular to the plane of the grating-coupled light guide 100 and then be transformed into the guided light 104 having a non-zero propagation angle within the grating-coupled light guide 100, e.g., a non-zero propagation angle consistent with a critical angle of total internal reflection within the grating-coupled light guide 100.

As illustrated in FIGS. 3A and 3B, the grating-coupled light guide 100 comprises a light guide 110. The light guide 110 may be a plate light guide, according to some embodiments. However, herein the term 'light guide' is being used for ease of discussion. The light guide 110 is configured to guide light along a length or extent of the light guide 110 as the guided light 104 of the grating-coupled light guide 100.

The illustrated grating-coupled light guide 100 further comprises an optical concentrator 120. The optical concentrator 120 is configured concentrate or collimate light to provide concentrated light 102', according to various embodiments. For example, the light source 106 may provide light 102 as substantially unconcentrated or uncollimated light 102". The provided unconcentrated or uncollimated light 102" is then concentrated by the optical concentrator 120 to provide the concentrated light 102'.

The grating-coupled light guide 100 illustrated in FIGS. 3A-3B further comprises a grating coupler 130 located at an input of the light guide 110, e.g., located adjacent to an input edge thereof. According to various embodiments, the grating coupler 130 is configured to diffractively redirect the concentrated light 102' into the light guide 110 as the guided light 104. In particular, the light is diffractively redirected into the light guide 110 at a non-zero propagation angle. Further, the guided light 104 has a first spread angle and a second spread angle, the first spread angle being orthogonal to the second spread angle. According to various embodiments, characteristics of the optical concentrator 120 and grating coupler 130 are configured in combination to determine the non-zero propagation angle, the first spread angle, and the second spread angle of the guided light 104 within the light guide 110.

According to some embodiments, the light guide 110 may be a slab or plate optical waveguide comprising an extended, substantially planar sheet of optically transparent, dielectric material that is configured to guide the guided light 104 using total internal reflection. For example, the planar sheet of optically transparent dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at the non-zero propagation angle between a first surface 112 (e.g., a 'back' surface or side) and a second surface 114 (e.g., a 'front' surface or side) of the light guide 110. In particular, the guided light 104 propagates by reflecting or 'bouncing' between the first surface 112 and the second surface 114 of the light guide 110 at the non-zero propagation angle. In some embodiments, a plurality of guided light beams comprising different colors of light may be guided by the light guide 110 as the guided light 104, each different color guided light beam of the guided light beam plurality having a different, color-specific, non-zero propagation angles. Note that the non-zero propagation angle is not illustrated in FIGS. 3A-3B for simplicity of illustration. However, a bold arrow depicting a propagation direction 103 illustrates a general propagation direction of the guided light 104 along the light guide length in FIGS. 3A-3B.

As defined herein, a 'non-zero propagation angle' is an angle relative to a surface (e.g., the first surface 112 or the second surface 114) of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110. The non-zero propagation angle may be substantially constant throughout a length of the light guide 110, according to some embodiments.

Regarding the optical concentrator 120, any of a variety of optical structures configured to provide concentration or collimation (e.g., partial collimation) of light may be employed including, but not limited to, a convex or biconvex lens, a parabolic reflector, and a semi-parabolic or shaped reflector. In particular, in some embodiments, the optical concentrator 120 comprises freeform optics configured to reduce a spread angle of the light from the light source 106. The freeform optics may be further configured to concentrate the light in a predefined area of a surface of the grating-coupled light guide 100. For example, the predefined area may correspond to an area occupied by the grating coupler 130 of the grating-coupled light guide 100. In other embodiments, the optical concentrator 120 may comprise a tapered collimator, a catadioptric collimator, or a reflective turning collimator. Some embodiments of the optical concentrator 120 may comprise a combination of one or more of the freeform optics, the tapered collimator, the catadioptric collimator, and the reflective turning collimator.

Figure 4:
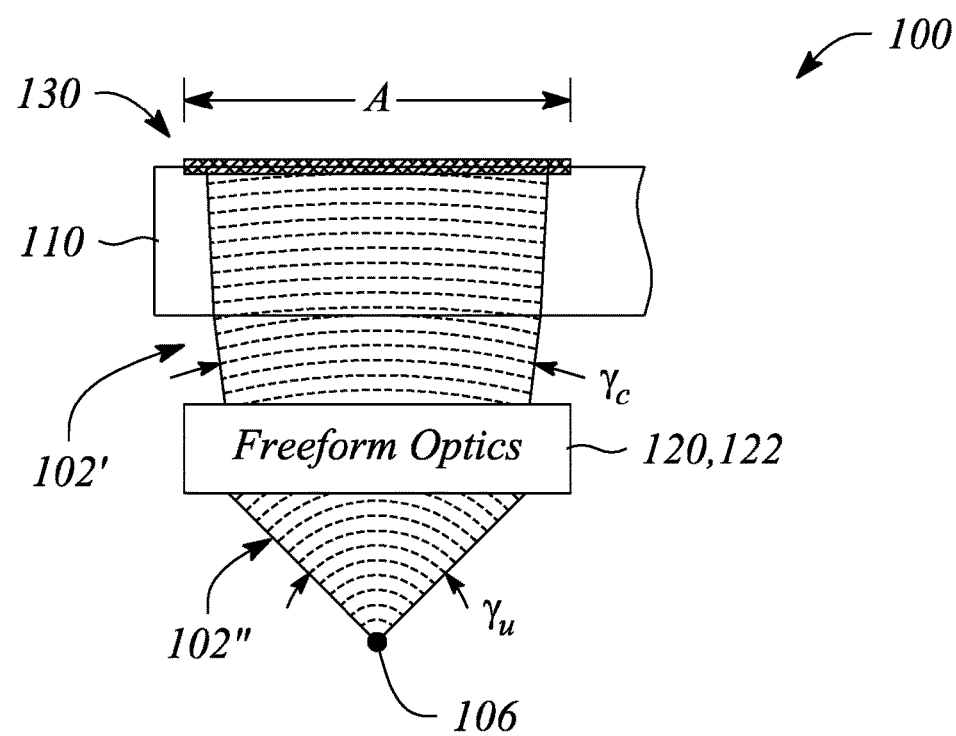
FIG. 4 illustrates a cross-sectional view of a portion of a grating-coupled light guide in an example, according to an embodiment consistent with the principles described herein.

FIG. 4 illustrates a cross-sectional view of a portion of a grating-coupled light guide 100 in an example, according to an embodiment consistent with the principles described herein. In particular, illustrated in FIG. 4 are the light source 106, the optical concentrator 120, a portion of the light guide 110, and the grating coupler 130 located at the input of the light guide portion. Also illustrated are the unconcentrated light 102" provided by the light source 106 and the concentrated light 102' provided at an output of the optical concentrator 120. As illustrated, the optical concentrator 120 comprises freeform optics 122 configured to concentrate the unconcentrated light 102" as the concentrated light 102'. Further, the freeform optics 122 of the optical concentrator 120 are configured to provide the concentrated light 102' in an area A corresponding to an area occupied by the grating coupler 130, as illustrated. Note that a beam angle $\gamma_c$ of the concentrated light 102' is less than a beam angle $\gamma_u$ of the unconcentrated light 102" (i.e., $\gamma_c < \gamma_u$), as illustrated and by definition.

Figure 5A:
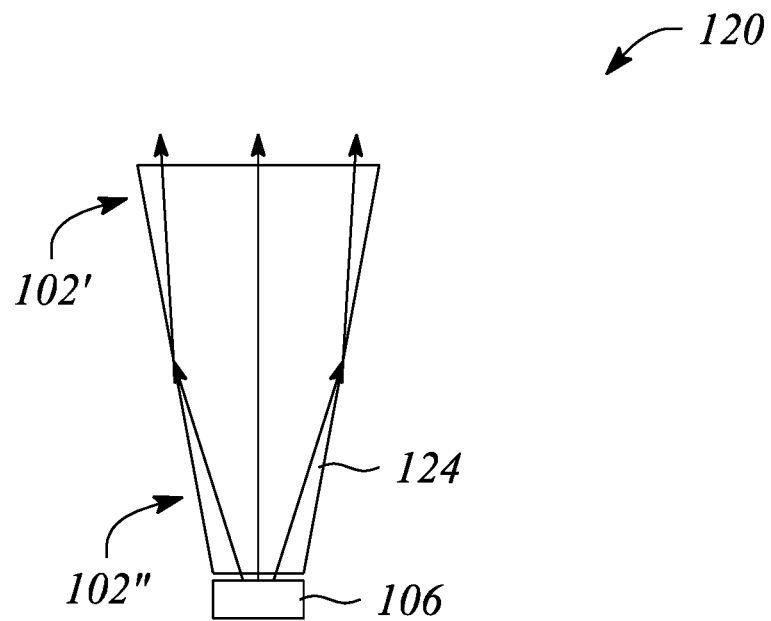
FIG. 5A illustrates a cross-sectional view of an optical concentrator in an example, according to an embodiment consistent with the principles described herein.

FIG. 5A illustrates a cross-sectional view of an optical concentrator 120 in an example, according to an embodiment consistent with the principles described herein. In particular, FIG. 5A illustrates the optical concentrator 120 comprising a tapered collimator 124. As illustrated, the tapered collimator 124 comprises a light guide having tapered sidewalls configured to reflect light by total internal reflection. The total internal reflection in combination with the tapered sidewalls selectively concentrates or collimates light propagating within the tapered collimator 124. Specifically, the unconcentrated light 102" from the light source 106 enters a narrow end of the tapered collimator 124 and propagates and reflects according to total internal reflection to an output end as the concentrated light 102'. Arrows in FIG. 5A illustrate light beams of light within the tapered collimator 124.

Figure 5B:
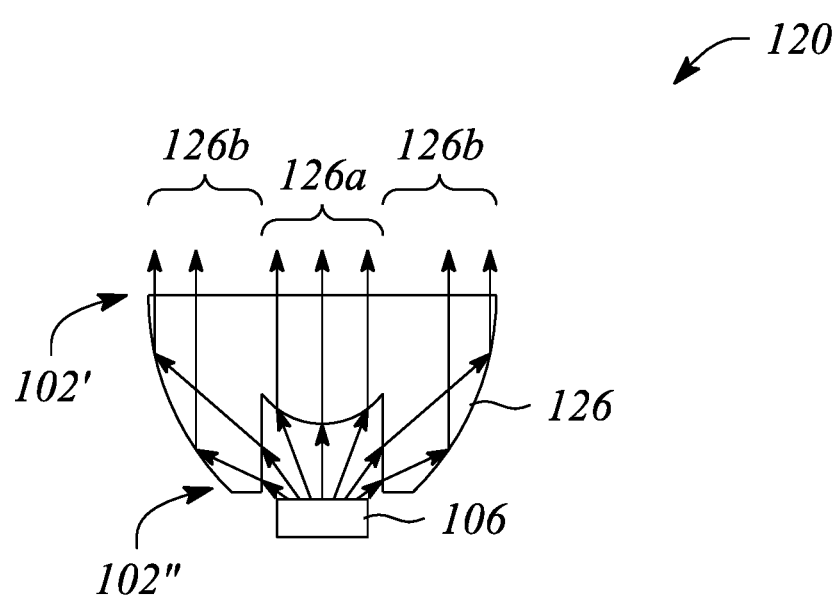
FIG. 5B illustrates a cross-sectional view of an optical concentrator in an example, according to another embodiment consistent with the principles described herein.

FIG. 5B illustrates a cross-sectional view of an optical concentrator 120 in an example, according to another embodiment consistent with the principles described herein. In particular, FIG. 5B illustrates the optical concentrator 120 comprising a catadioptric collimator 126. As illustrated, the catadioptric collimator 126 comprises a first portion 126a configured as a collimating lens to collimate a portion of the unconcentrated light 102" corresponding to an inner beam portion thereof. The catadioptric collimator 126 further comprises second portion 126b configured as a collimating reflector to collimate an outer beam portion of the unconcentrated light 102". In FIG. 5B, arrows illustrate light beams within the unconcentrated light 102". The light beams in the inner beam portion of the unconcentrated light 102" pass through and are concentrated or collimated by refraction in the first portion 126a as a result of the collimating lens, while the light beams of the outer beam portion enter the catadioptric collimator 126 and are concentrated or collimated by reflection from the collimating reflector of the second portion 126b. In various embodiments, the catadioptric collimator 126 may comprise a transparent dielectric material. An outer surface of the second portion 126b may be coated with a reflective material or layer (e.g., a reflective metal) to enhance reflection of the light beams, in some embodiments.

Figure 5C:
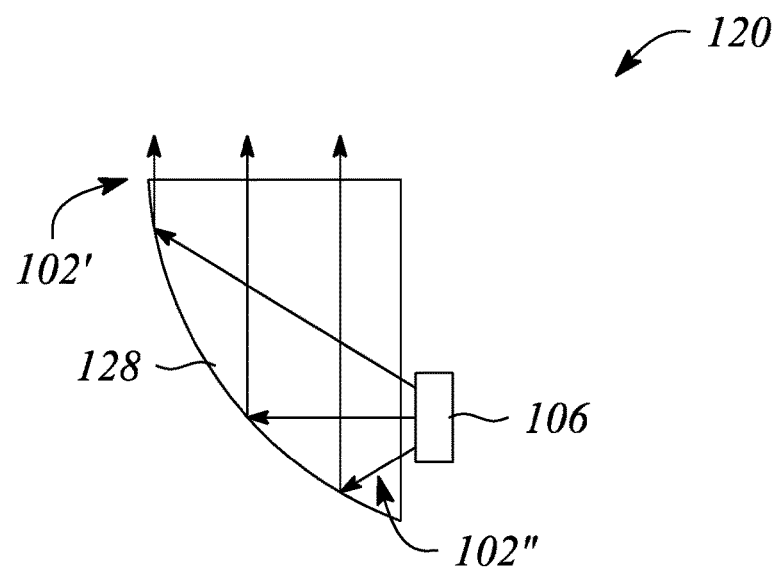
FIG. 5C illustrates a cross-sectional view of an optical concentrator in an example, according to yet another embodiment consistent with the principles described herein.

FIG. 5C illustrates a cross-sectional view of an optical concentrator 120 in an example, according to yet another embodiment consistent with the principles described herein. In particular, FIG. 5C illustrates the optical concentrator 120 comprising a reflective turning collimator 128. The reflective turning collimator 128 comprises a reflective surface configured to reflectively concentrate the unconcentrated light 102" to provide the concentrated light 102'. For example, the reflective surface may be a parabolic or semi-parabolic reflector (e.g., a shaped parabolic reflector). Arrows in FIG. 5C represent light beams within the reflective turning collimator 128 to illustrate light concentration.

Referring again to FIGS. 3A and 3B, the grating coupler 130 of the grating-coupled light guide 100 is configured to couple light 102 from the light source 106 and optical concentrator 120 into the light guide 110 using diffraction. In particular, the grating coupler 130 is configured to receive the concentrated light 102' from the optical concentrator 120 and to diffractively redirect (i.e., diffractively couple) the concentrated light 102' into the light guide 110 at the non-zero propagation angle as the guided light 104. As mentioned above, the guided light 104 that is diffractively directed or coupled into the light guide 110 by the grating coupler 130 has controlled or predetermined propagation characteristics (i.e., spread angles), according to various examples.

In particular, as noted above, characteristics of the both of the optical concentrator and the grating coupler 130 are cooperatively configured to determine the propagation characteristics of the guided light 104 or a light beam thereof. The propagation characteristics determined by the optical concentrator 120 and grating coupler 130 may include one or more of the non-zero propagation angle, a first spread angle, and a second spread angle of the guided light 104. The 'first spread angle,' by definition herein, is a predetermined spread angle of the guided light 104 in a plane that is substantially perpendicular to a surface (e.g., the first surface 112 or the second surface 114) of the light guide 110. Further, the first spread angle represents an angle of beam spread as the light beam of the guided light 104 propagates in a direction defined by the non-zero propagation angle (e.g., beam spread in a vertical plane), by definition herein. The 'second spread angle' is an angle in plane that is substantially parallel to the light guide surface, by definition herein. The second spread angle represents a predetermined spread angle of the guided light beam as the guided light 104 propagates in a direction (i.e., in a plane) that is substantially parallel to the light guide surface (e.g., in a horizontal plane).

According to various examples, the grating coupler 130 includes a diffraction grating 132 having a plurality of spaced-apart diffractive features. The first spread angle and the non-zero propagation angle of the guided light 104 may be controlled or determined by a pitch and, to some extent, a lateral shape of the diffractive features of the diffraction grating 132, according to some examples. That is, by selecting a pitch of the diffraction grating 132 in a direction corresponding to the general propagation direction of the guided light 104, a diffraction angle of the diffraction grating 132 may be used to produce the non-zero propagation angle. In addition, by varying the pitch and other aspects of the diffractive features along a length and across a width the diffraction grating 132 of the grating coupler 130, the first angular spread of the guided light 104 may be controlled, i.e., to provide the predetermined first angular spread, according to some examples.

Further, according to some examples, the predetermined second spread angle of the guided light 104 may be controlled by a lateral shape or width variation of the diffraction grating 132 of the grating coupler 130. For example, a diffraction grating 132 that increases in width from a first end toward a second end of the diffraction grating 132 (i.e., a fan-shaped grating) may produce a relatively large second spread angle of the redirected, guided light 104 (i.e., a fan-shaped optical beam). In particular, according to some embodiments, the predetermined second spread angle may be substantially proportional to an angle of the increase in a width of the diffraction grating 132 of the grating coupler 130. In another example, a diffraction grating 132 that has relatively little variation in width (e.g., with substantially parallel sides) may provide a relatively small second spread angle of the light beam of guided light 104. A relatively small second spread angle (e.g., a spread angle that is substantially zero) may provide the guided light 104 that is collimated or at least substantially collimated in a horizontal direction parallel or coplanar with the light guide surface, for example.

Figure 6A:
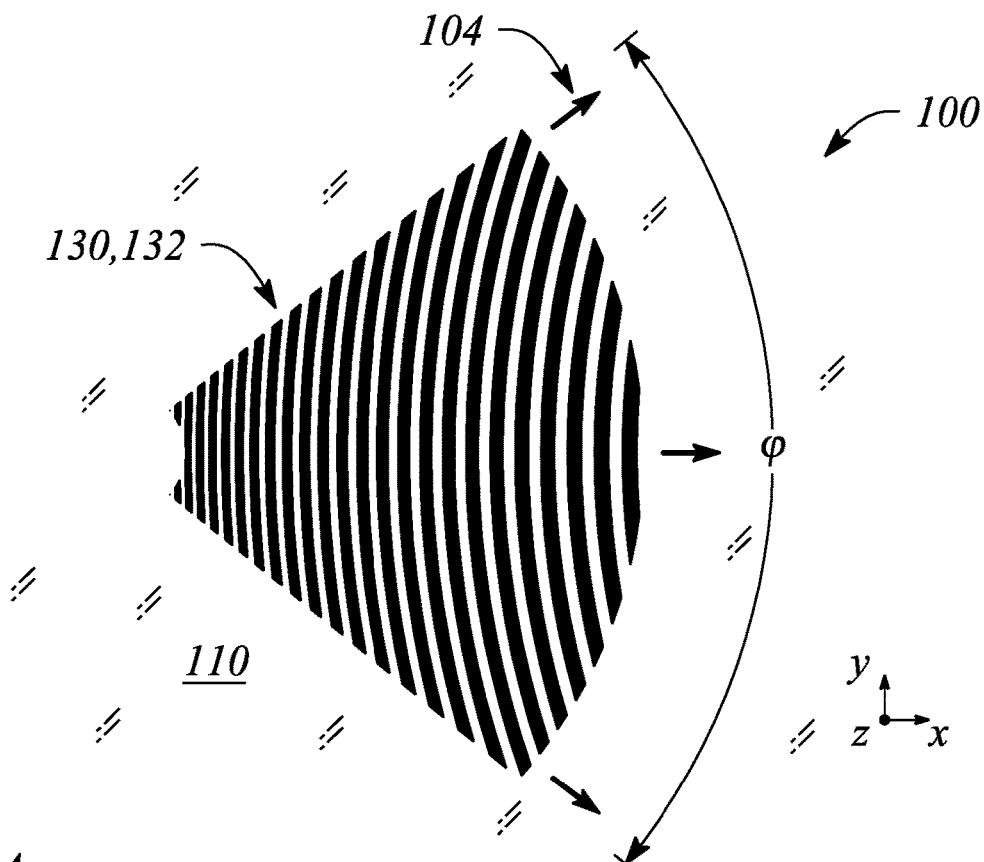
FIG. 6A illustrates a plan view of a grating coupler on a surface of a grating-coupled light guide in an example, according to an embodiment consistent with the principles described herein.
Figure 6B:
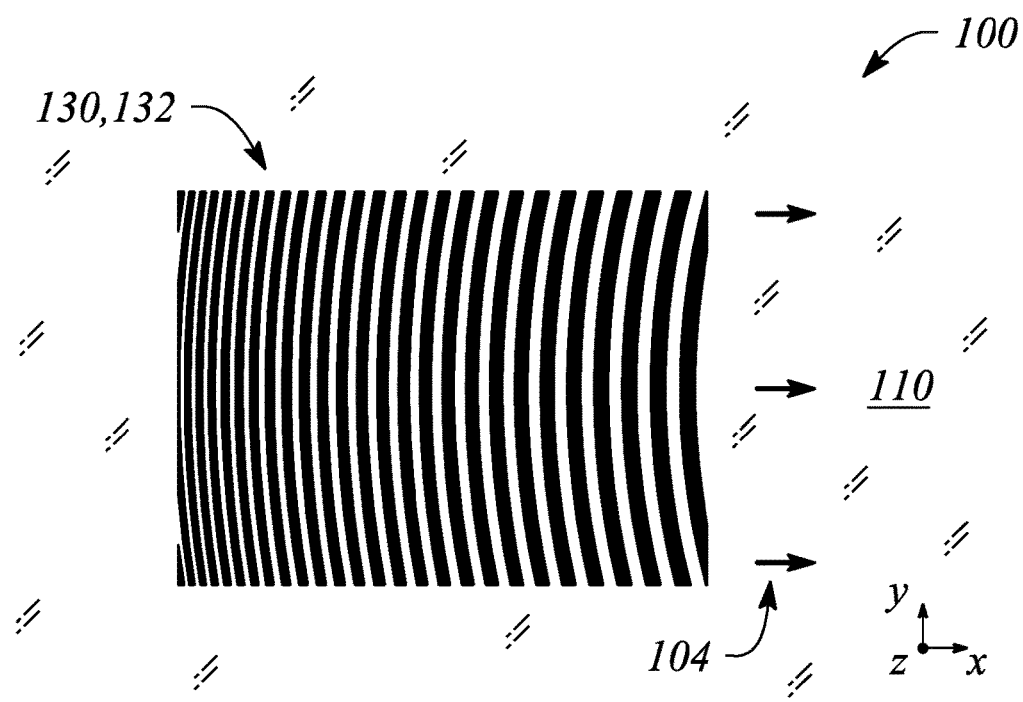
FIG. 6B illustrates a plan view of a grating coupler on a surface of grating-coupled light guide in an example, according to another embodiment consistent with the principles described herein.

FIG. 6A illustrates a plan view of a grating coupler 130 on a surface of a grating-coupled light guide 100 in an example, according to an embodiment consistent with the principles described herein. FIG. 6B illustrates a plan view of a grating coupler 130 on a surface of a grating-coupled light guide 100 in an example, according to another embodiment consistent with the principles described herein. In particular, FIG. 6A illustrates a grating coupler 130 having a diffraction grating 132 that is fan-shaped, as viewed from a surface (e.g., a top surface or a bottom surface) of the light guide 110. The fan-shaped diffraction grating 132 has a width that increases from a first end toward a second end of the diffraction grating 132, where the width increase defines a fan angle φ. As illustrated, the diffraction grating fan angle φ is about eighty (80) degrees. The fan-shaped diffraction grating 132 may provide a fan-shaped optical beam of guided light 104 (e.g., illustrated using bold arrows) having a predetermined second spread angle that is proportional to the fan angle φ according to various examples.

FIG. 6B, on the other hand, illustrates a grating coupler 130 having a rectangular-shaped diffraction grating 132 (e.g., having a fan angle φ equal to about zero), as viewed from the plate light guide surface. The rectangular-shaped diffraction grating 132 may produce a substantially collimated optical beam of guided light 104, i.e., an optical beam of guided light 104 having a predetermined second spread angle that is about zero. The substantially collimated optical beam of guided light 104 is illustrated using parallel bold arrows in FIG. 6B. As such, the fan angle φ of the diffraction grating 132 may be used to control or determine the second spread angle of the guided light 104, according to various embodiments.

According to some embodiments, the grating coupler 130 may be a transmissive grating coupler 130 (i.e., a transmission mode diffraction grating coupler), while in other examples, the grating coupler 130 may be a reflective grating coupler 130 (i.e., a reflection mode diffraction grating coupler). In particular, as illustrated in FIG. 3A, the grating coupler 130 may include a transmission mode diffraction grating 132' at a surface of the light guide 110 adjacent to the light source 106 and optical concentrator 120. For example, the transmission mode diffraction grating 132' of the grating coupler 130 may be on a bottom (or first) surface 112 of the light guide 110 and the light source 106 may illuminate the grating coupler 130 through the optical concentrator 120 from the bottom. As illustrated in FIG. 3A, the transmission mode diffraction grating 132' of the grating coupler 130 is configured to diffractively redirect concentrated light 102' that is transmitted or passes through diffraction grating 132.

Alternatively, as illustrated in FIG. 3B, the grating coupler 130 may be a reflective grating coupler 130 having a reflection mode diffraction grating 132" at a second surface 114 of the light guide 110 that is opposite to the surface adjacent to the light source 106 and optical concentrator 120. For example, the reflection mode diffraction grating 132" of the grating coupler 130 may be on a top (or second) surface 114 of the light guide 110 and the light source 106 may illuminate the grating coupler 130 through the optical concentrator and then through a portion of the bottom (or first) surface 112 of the light guide 110, as illustrated. The reflection mode diffraction grating 132" is configured to diffractively redirect light 102 into the light guide 110 using reflective diffraction (i.e., reflection and diffraction), as illustrated in FIG. 3B.

According to various examples, diffractive grating 132 of the grating coupler 130 may include grooves, ridges or similar diffractive features of a diffraction grating formed or otherwise provided on or in the surface 112, 114 of the light guide 110. For example, grooves or ridges may be formed in or on the light source-adjacent first surface 112 (e.g., bottom surface) of the light guide 110 to serve as the transmission mode diffraction grating 132' of the transmissive grating coupler 130. Similarly, grooves or ridges may be formed or otherwise provided in or on the second surface 114 of the light guide 110 opposite to the light source-adjacent first surface 112 to serve as the reflection mode diffraction grating 132" of the reflective grating coupler 130, for example.

According to some examples, the grating coupler 130 may include a grating material (e.g., a layer of grating material) on or in the plate light guide surface. In some examples, the grating material may be substantially similar to a material of the light guide 110, while in other examples, the grating material may differ (e.g., have a different refractive index) from the plate light guide material. In some examples, the diffractive grating grooves in the plate light guide surface may be filled with the grating material. For example, grooves of the diffraction grating 132 of either the transmissive grating coupler 130 or the reflective grating coupler 130 may be filled with a dielectric material (i.e., the grating material) that differs from a material of the light guide 110. The grating material of the grating coupler 130 may include silicon nitride, for example, while the light guide 110 may be glass, according to some examples. Other grating materials including, but not limited to, indium tin oxide (ITO) may also be used.

In other examples, either the transmissive grating coupler 130 or the reflective grating coupler 130 may include ridges, bumps, or similar diffractive features that are deposited, formed or otherwise provided on the respective surface of the light guide 110 to serve as the particular diffraction grating 132. The ridges or similar diffractive features may be formed (e.g., by etching, molding, etc.) in a dielectric material layer (i.e., the grating material) that is deposited on the respective surface of the light guide 110, for example. In some examples, the grating material of the reflective grating coupler 130 may include a reflective metal. For example, the reflective grating coupler 130 may be or include a layer of reflective metal such as, but not limited to, gold, silver, aluminum, copper and tin, to facilitate reflection by the reflection mode diffraction grating 132".

According to various examples, the grating coupler 130 (i.e., either the transmissive grating coupler or the reflective grating coupler) is configured to produce a grating spatial phase function that is a difference between an output phase profile of the guided light 104 and an input phase profile of the light 102 incident from the light source 106. For example, if the light source 106 as viewed through the optical concentrator 120 approximates a point source at a distance f from the transmissive grating coupler 130, the input phase profile $\phi_{in}$ of the light may be given by equation (2) as $$\phi_{in}(x, y) = \frac{2\pi}{\lambda} \cdot \sqrt{f^2 + x^2 + y^2} \qquad (2)$$

where x and y are spatial coordinates of the transmissive grating coupler 130 and λ is wavelength in free space (i.e., a vacuum). The transmissive grating coupler 130 may be configured to produce a beam of guided light 104 that propagates away from an arbitrary center point $(x_0, y_0)$ of the grating coupler 130 at an angle θ. As such, an output phase profile $\phi_{out}$ of the guided light 104 produced by the transmissive grating coupler 130 may be given by equation (3) as $$\phi_{out}(x, y) = \frac{2\pi}{\lambda} \cdot n\cos(\theta) \cdot \sqrt{(x - x_0)^2 + (y - y_0)^2} \qquad (3)$$

where n is an index of refraction of the light guide 110. The grating spatial phase function of the transmissive grating coupler 130 may be determined from a difference between equation (2) and equation (3). In addition, a horizontal spread angle (e.g., in an x-y plane) may be determined by an envelope function of the diffraction grating 132 of the transmissive grating coupler 130, according to various examples. When considering a reflective grating coupler 130, propagation of the light 102 through the optical concentrator as wells as both the light source-adjacent first surface 112 (e.g., bottom surface) of the light guide 110 (i.e., refraction) and through a material of the light guide 110 also is taken into account. Further, with a reflective grating coupler 130, optional metallization (e.g., use of metal or a metal layer) may improve grating efficiency (e.g., by effectively eliminating a zero-th order transmitted diffraction order of a diffraction grating of the reflection grating coupler 130).

Figure 7A:
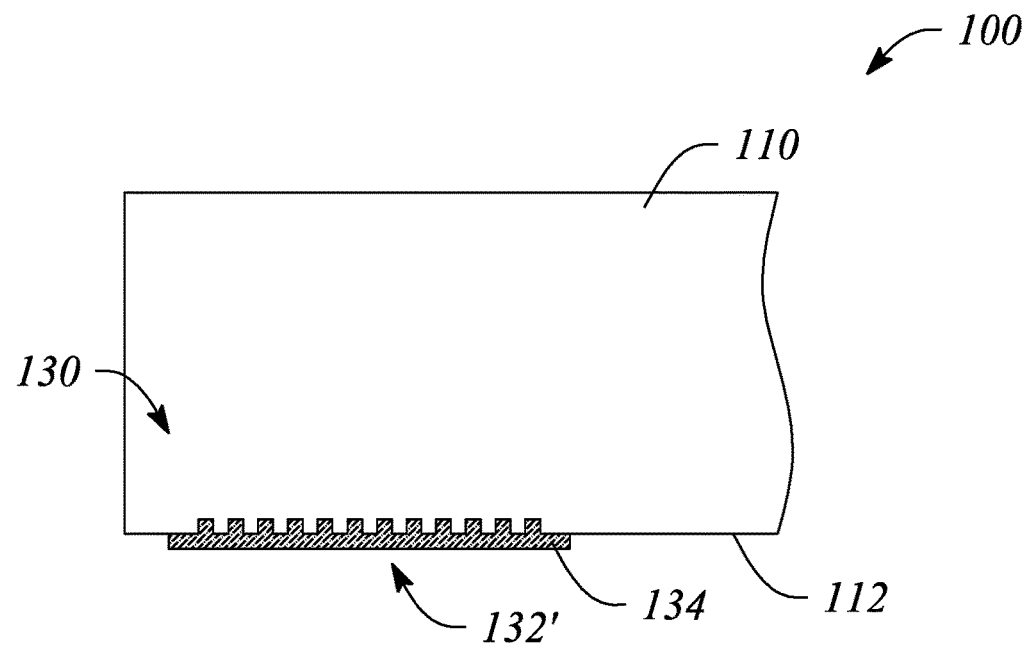
FIG. 7A illustrates a cross sectional view of a portion of the grating-coupled light guide in an example, according to an embodiment consistent with the principles described herein.
Figure 7B:
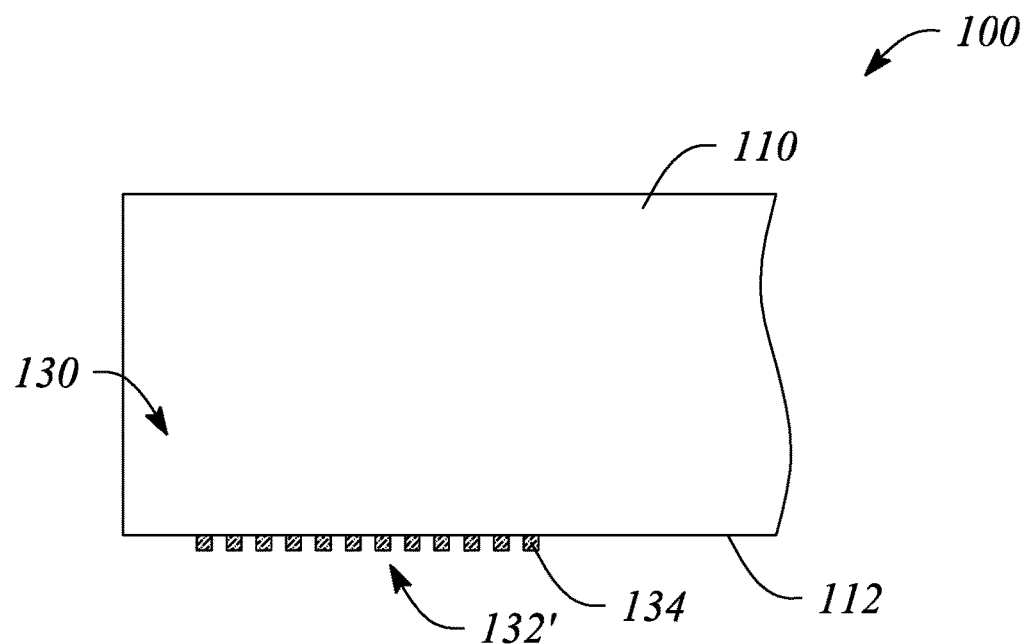
FIG. 7B illustrates a cross sectional view of a portion of the grating-coupled light guide in an example, according to an embodiment consistent with the principles described herein.

FIG. 7A illustrates a cross sectional view of a portion of the grating-coupled light guide 100 in an example, according to an embodiment consistent with the principles described herein. FIG. 7B illustrates a cross sectional view of a portion of the grating-coupled light guide 100 in an example, according to an embodiment consistent with the principles described herein. In particular, both FIGS. 7A and 7B illustrate a portion of the grating-coupled light guide 100 of FIG. 3A that includes the grating coupler 130. Further, the grating coupler 130 illustrated in FIGS. 7A-7B is a transmissive grating coupler 130 that includes a transmission mode diffraction grating 132'.

As illustrated in FIG. 7A, the transmissive grating coupler 130 includes grooves (i.e., diffractive features) formed in a bottom (or light source-adjacent) surface 112 of the light guide 110 to form the transmission mode diffraction grating 132'. Further, the transmission mode diffraction grating 132' of the transmissive grating coupler 130 illustrated in FIG. 7A includes a layer of grating material 134 (e.g., silicon nitride) that is also deposited in the grooves. FIG. 7B illustrates a transmissive grating coupler 130 that includes ridges (i.e., diffractive features) of the grating material 134 on the bottom or light source-adjacent surface 112 of the light guide 110 to form the transmission mode diffraction grating 132'. Etching or molding a deposited layer of the grating material 134, for example, may produce the ridges. In some examples, the grating material 134 that makes up the ridges illustrated in FIG. 7B may include a material that is substantially similar to a material of the light guide 110. In other examples, the grating material 134 may differ from the material of the light guide 110. For example, the light guide 110 may include a glass or a plastic/polymer sheet and the grating material 134 may be a different material such as, but not limited to, silicon nitride, that is deposited on the light guide 110.

Figure 8A:
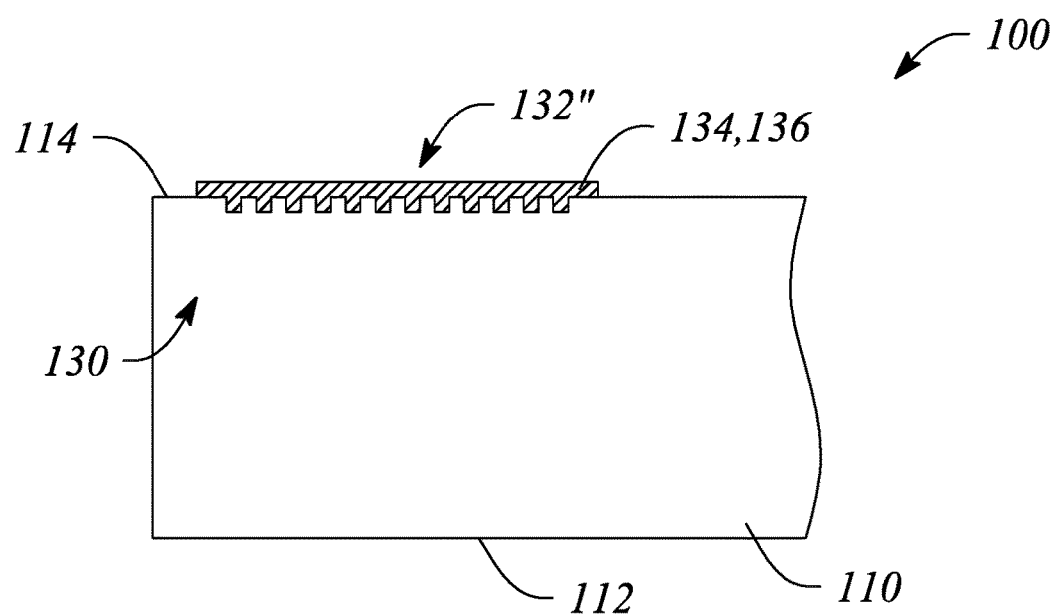
FIG. 8A illustrates a cross sectional view of a portion of the grating-coupled light guide in an example, according to an embodiment consistent with the principles described herein.
Figure 8B:
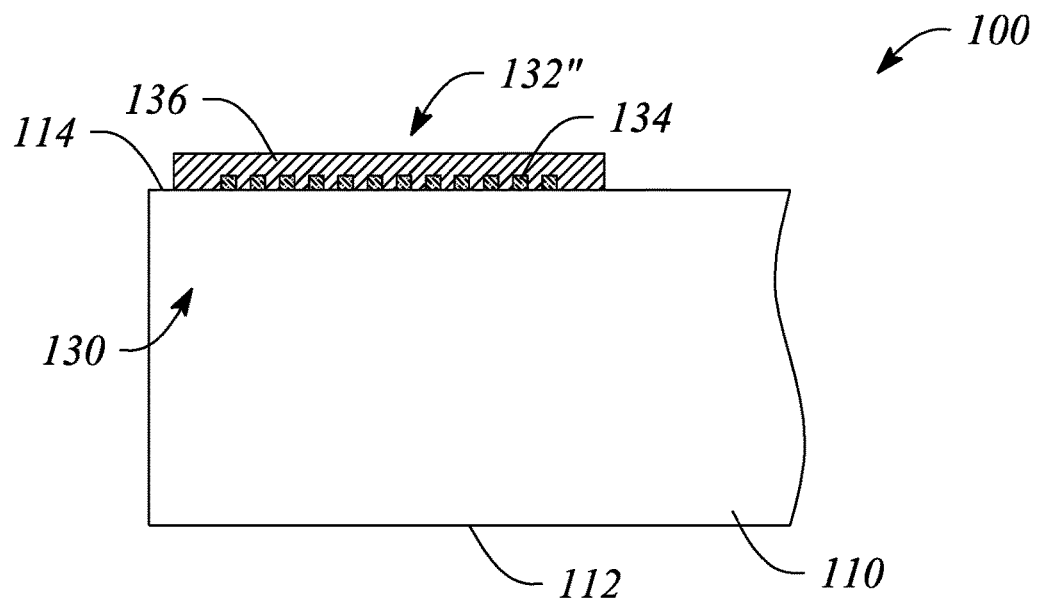
FIG. 8B illustrates a cross sectional view of a portion of the grating-coupled light guide in an example, according to an embodiment consistent with the principles described herein.

FIG. 8A illustrates a cross sectional view of a portion of the grating-coupled light guide 100 in an example, according to an embodiment consistent with the principles described herein. FIG. 8B illustrates a cross sectional view of a portion of the grating-coupled light guide 100 in an example, according to an embodiment consistent with the principles described herein. In particular, both FIGS. 8A and 8B illustrate a portion of the grating-coupled light guide 100 of FIG. 3B that includes the grating coupler 130, where the grating coupler 130 is a reflective grating coupler 130 having a reflection mode diffraction grating 132". As illustrated, the reflective grating coupler 130 (i.e., a reflection mode diffraction grating coupler) is at or on the second surface 114 of the light guide 110 opposite the first surface 112 that is adjacent to the light source and optical collimator, e.g., light source 106 and optical concentrator 120 illustrated in FIG. 3B, (i.e., a light source-opposite second surface 114).

In FIG. 8A, the reflection mode diffraction grating 132" of the reflective grating coupler 130 includes grooves (diffractive features) formed in the light source-opposite second surface 114 (e.g., top surface) of the light guide 110 to reflectively diffract and redirect incident concentrated light 102' through the light guide 110. As illustrated, the grooves are filled with and further backed by a layer 136 of a metal material to provide additional reflection and improve a diffractive efficiency of the illustrated reflective grating coupler 130. In other words, the grating material 134 includes the metal layer 136, as illustrated. In other examples (not illustrated), the grooves may be filled with a grating material (e.g., silicon nitride) and then backed or substantially covered by the metal layer, for example.

FIG. 8B illustrates a reflective grating coupler 130 that includes ridges (diffractive features) formed of the grating material 134 on the second surface 114 of the light guide 110 to create the reflection mode diffraction grating 132". The ridges may be etched from a layer of silicon nitride (i.e., the grating material), for example. In some examples, a metal layer 136 is provided to substantially cover the ridges of the reflection mode diffraction grating 132" to provide increased reflection and improve the diffractive efficiency, for example.

In some examples, the grating-coupled light guide 100 may further comprise the light source 106 (e.g., illustrated in FIGS. 3A and 3B). As mentioned above, in some examples, the light source 106 may be an uncollimated light source 106. For example, the light source 106 may be a surface emitting LED chip mounted on a circuit board and configured to illuminate a space adjacent to (e.g., above) the LED chip on the circuit board. In some examples, the light source 106 may approximate a point source. In particular, the light source 106 may have or exhibit illumination characterized by a broad cone angle. For example, a cone angle of the light source 106 may be greater than about ninety (90) degrees. In other examples, the cone angle may be greater than about eighty (80) degrees, or greater than about seventy (70) degrees, or greater than about sixty (60) degrees. For example, the cone angle may be about forty-five (45) degrees. According to various examples, a central ray of the light 102 from the light source 106 after passing through the optical concentrator 120 may be configured to be incident on the grating coupler 130 at an angle that is substantially orthogonal to a surface of the light guide 110.

In some embodiments, substantially uncollimated light 102" produced by the uncollimated light source 106 is substantially collimated by a combination of the optical concentrator 120 and the diffractive redirection provided by the grating coupler 130 as collimated guided light 104. In other embodiments, the diffractively redirected guided light 104 is substantially uncollimated, at least in one direction (e.g., when a fan-shaped beam is produced). In yet other examples, the guided light 104 may be substantially collimated by the combination of the optical concentrator 120 and the grating coupler 130 in first direction (e.g., corresponding to a first spread angle about the non-zero propagation angle) and substantially uncollimated in a second direction (e.g., corresponding to the second spread angle). For example, the optical concentrator 120 in combination with the grating coupler 130 may provide a fan-shaped beam in a horizontal direction parallel to the plate light guide surfaces and a substantially collimated beam (i.e., a spread angle equal to about zero) in a vertical direction or plane perpendicular to the light guide surfaces.

In some embodiments of the principles described herein, a grating-coupled light guide system is provided. The grating-coupled light guide system has a variety of uses. For example, the grating-coupled light guide system may be a multiview backlight. The multiview backlight may be employed in a three-dimensional (3D) or multiview display, for example. In another embodiment, the grating-coupled light guide system may be used as a backlight in a privacy display. In yet another embodiment, a portion of the grating-coupled light guide system, such as a light guide of the grating-coupled light guide system, may be employed in a touch-sensitive panel to sense one or both of a location at which the touch panel is touched and a pressure at which the touch is applied using frustrated total internal reflection (FTIR).

Figure 9A:
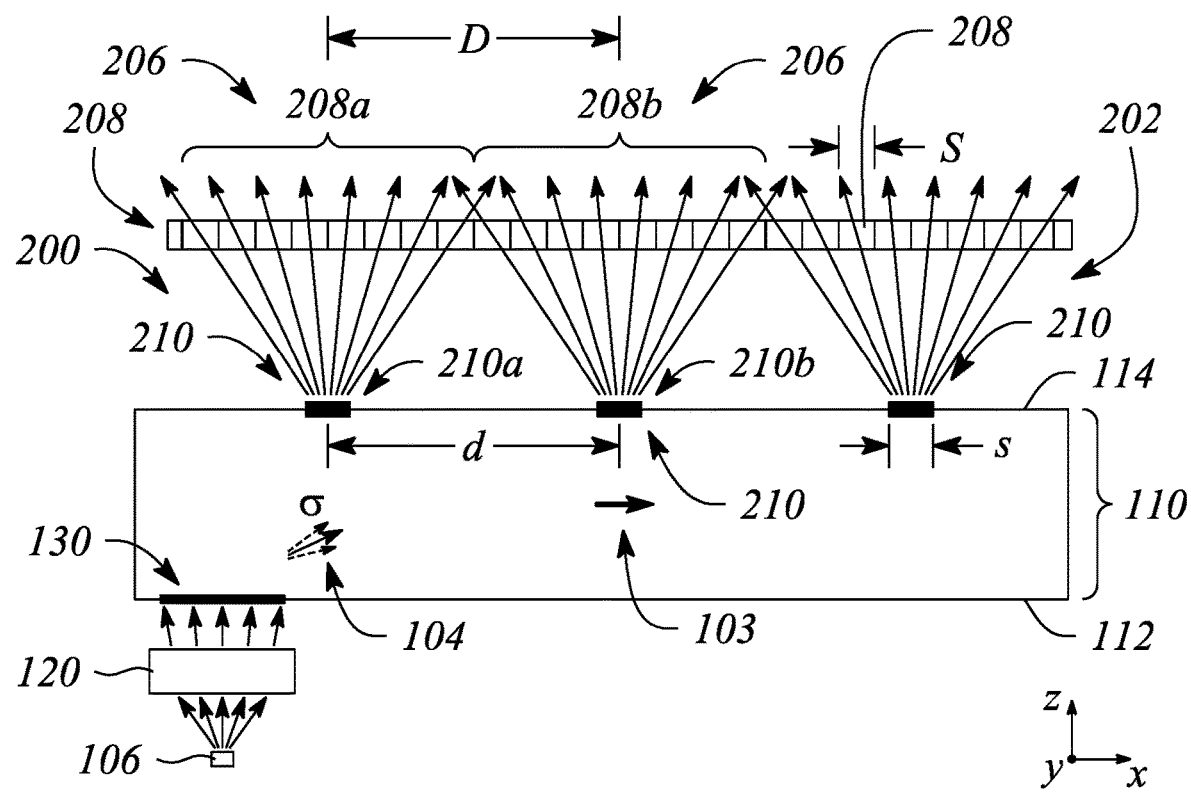
FIG. 9A illustrates a cross sectional view of a multiview backlight in an example, according to an embodiment consistent with the principles described herein.
Figure 9B:
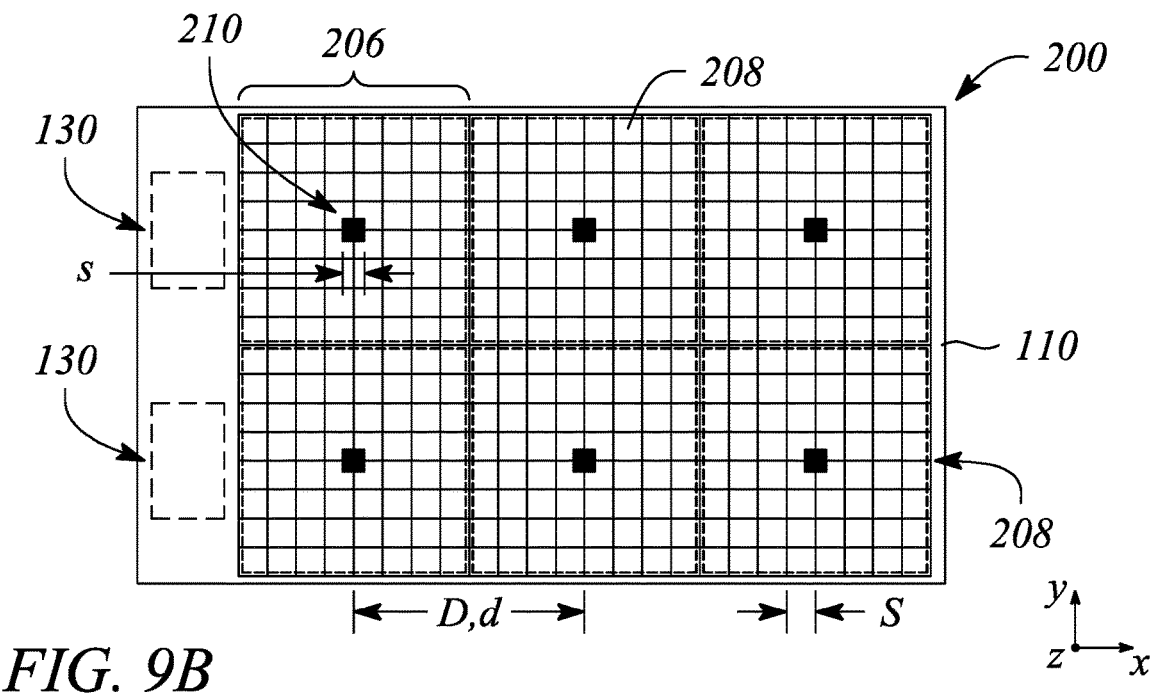
FIG. 9B illustrates a plan view of a multiview backlight in an example, according to an embodiment consistent with the principles described herein.
Figure 9C:
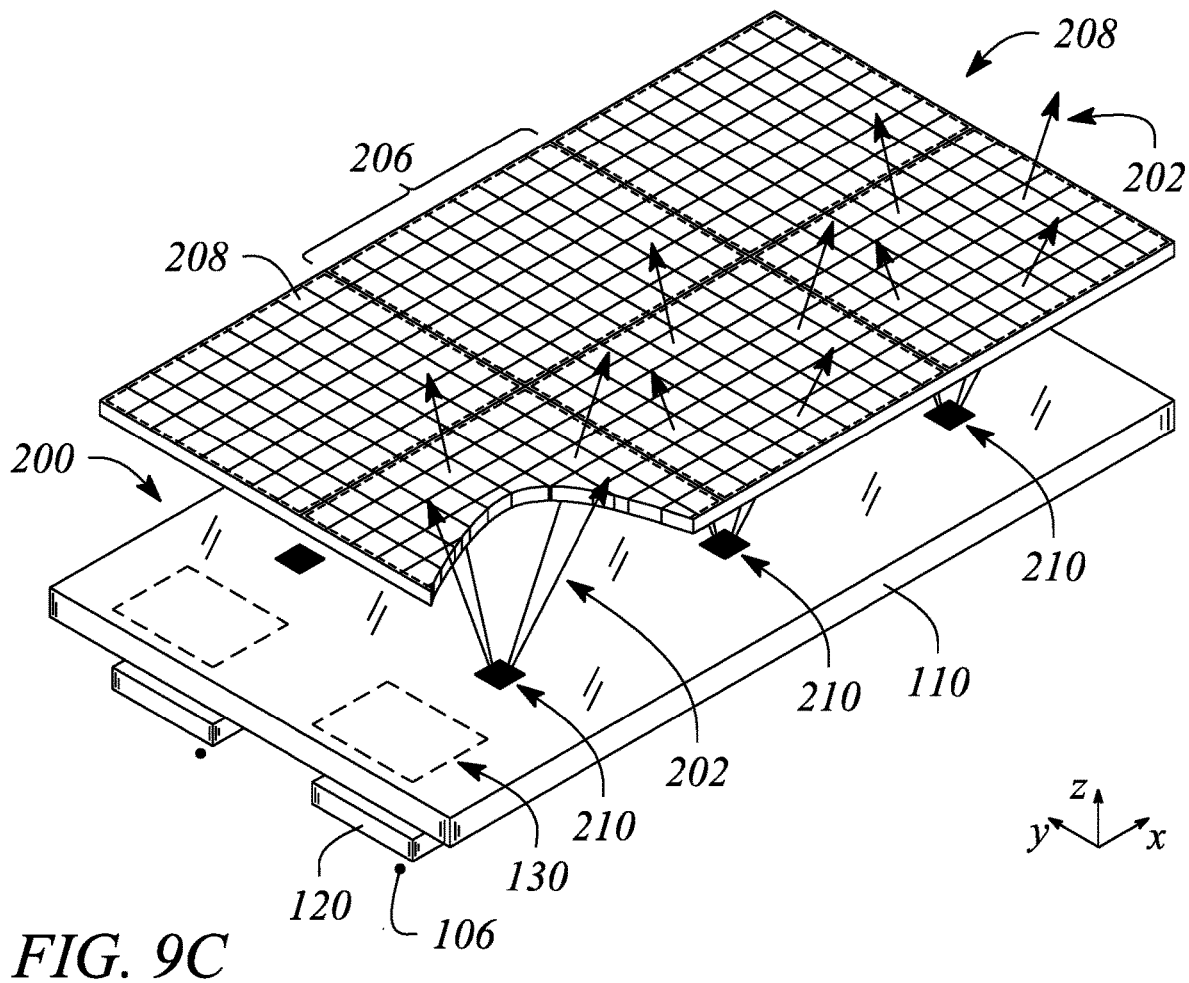
FIG. 9C illustrates a perspective view of a multiview backlight in an example, according to an embodiment consistent with the principles described herein.

FIG. 9A illustrates a cross sectional view of a multiview backlight 200 in an example, according to an embodiment consistent with the principles described herein. FIG. 9B illustrates a plan view of a multiview backlight 200 in an example, according to an embodiment consistent with the principles described herein. FIG. 9C illustrates a perspective view of a multiview backlight 200 in an example, according to an embodiment consistent with the principles described herein. As illustrated, the multiview backlight 200 comprises the grating-coupled light guide 100 including the light guide 110, the optical concentrator 120, and the grating coupler 130, e.g., illustrated as a transmissive grating coupler 130 similar to FIG. 3A, by way of example and not limitation. Also illustrated in FIG. 9A are the guided light 104 having a collimation factor σ and a propagation direction 103 within the light guide 110 as well as the light source 106.

The multiview backlight 200 illustrated in FIG. 9A-9C further comprises an array or plurality of multibeam elements 210. According to various embodiments, each multibeam element 210 of the multibeam element plurality is configured to scatter from the light guide 110 a portion of the guided light 104 as a plurality of directional light beams 202. Directional light beams 202 of the directional light beam plurality have different principal angular directions from one another, according to various embodiments. Further, the different principal angular directions of the directional light beams 202 may correspond to respective different view directions of a multiview display comprising multiview backlight 200, according to some embodiments. In FIGS. 9A and 9C, the directional light beams 202 are illustrated as a plurality of diverging arrows depicted as being directed away from the second surface 114 (front surface) of the light guide 110.

According to various embodiments, multibeam elements 210 of the multibeam element plurality may be spaced apart from one another along a length of the light guide 110. In particular, the multibeam elements 210 may be separated from one another by a finite space and represent individual, distinct elements along the light guide length. Further the multibeam elements 210 generally do not intersect, overlap or otherwise touch one another, according to some embodiments. That is, each multibeam element 210 of the multibeam element plurality is generally distinct and separated from other ones of the multibeam elements 210.

According to some embodiments, the plurality of multibeam elements 210 may be arranged in either a one-dimensional (1D) array or two-dimensional (2D) array. For example, the plurality of multibeam elements 210 may be arranged as a linear 1D array. In another example, the plurality of multibeam elements 210 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 210 may be substantially uniform or constant across the array. In other examples, the inter-element distance between the multibeam elements 210 may be varied one or both of across the array and along the length of the light guide 110.

In some embodiments, a size of the multibeam element 210 may be comparable to a size of a light valve of a multiview display that employs the multiview backlight 200. Herein, the 'size' may be defined in any of a variety of manners to include, but not be limited to, a length, a width, or an area. For example, the size of a light valve may be a length thereof and the comparable size of the multibeam element 210 may also be a length of the multibeam element 210. In another example, size may refer to an area such that an area of the multibeam element 210 may be comparable to an area of the light valve. In other examples, the light valve size may be defined as a distance (e.g., a center-to-center distance) between adjacent light valves. For example, the light valves may be smaller than the center-to-center distance between the light valves in the light valve array. The light valve size may be defined as a size corresponding to the center-to-center distance between the adjacent light valves, for example.

In some embodiments, the size of the multibeam element 210 is comparable to the light valve size such that the multibeam element size is between about fifty percent (50%) and about two hundred percent (200%) of the view pixel size. In other examples, the multibeam element size is greater than about sixty percent (60%) of the light valve size, or about seventy percent (70%) of the light valve size, or greater than about eighty percent (80%) of the light valve size, or greater than about ninety percent (90%) of the light valve size, and the multibeam element 210 is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. For example, by 'comparable size', the multibeam element size may be between about seventy-five percent (75%) and about one hundred fifty (150%) of the light valve size. In another example, the multibeam element 210 may be comparable in size to the light valve where the multibeam element size is between about one hundred twenty-five percent (125%) and about eighty-five percent (85%) of the light valve size. According to some embodiments, the comparable sizes of the multibeam element 210 and the light valve may be chosen to reduce, or in some examples to minimize, dark zones between views of the multiview display, while at the same time reducing, or in some examples minimizing, an overlap between views of the multiview display. FIGS. 9A-9C also illustrate multiview pixels 206 along with the multiview backlight 200 for the purpose of facilitating discussion. In FIGS. 9A-9B, the multibeam element size is denoted 's' and the light valve size is denoted 'S'.

FIGS. 9A-9C further illustrate an array of light valves 208 configured to modulate the directional light beams 202 of the directional light beam plurality. The light valve array may be part of the multiview display that employs the multiview backlight 200, for example, and is illustrated in FIGS. 9A-9C along with the multiview backlight 200 for the purpose of facilitating discussion herein. In FIG. 9C, the array of light valves 208 is partially cut-away to allow visualization of the light guide 110 and the multibeam element 210 underlying the light valve array. In various embodiments, different types of light valves may be employed as the light valves 208 of the light valve array including, but not limited to, one or more of liquid crystal light valves, electrophoretic light valves, and light valves based on electrowetting.

As illustrated in FIGS. 9A-9C, different ones of the directional light beams 202 pass through and may be modulated by different ones of the light valves 208 in the light valve array. Further, as illustrated, a light valve 208 of the array corresponds to a view pixel, and a set of the light valves 208 corresponds to a multiview pixel of the multiview display. In particular, a different set of light valves 208 of the light valve array is configured to receive and modulate the directional light beams 202 from different ones of the multibeam elements 210, i.e., there is one unique set of light valves 208 for each multibeam element 210, as illustrated.

As illustrated in FIG. 9A, a first light valve set 208a is configured to receive and modulate the directional light beams 202 from a first multibeam element 210a, while a second light valve set 208b is configured to receive and modulate the directional light beams 202 from a second multibeam element 210b. Thus, each of the light valve sets (e.g., the first and second light valve sets 208a, 208b) in the light valve array corresponds, respectively, to a different multiview pixel, with individual light valves 208 of the light valve sets corresponding to the view pixels of the respective multiview pixels, as illustrated in FIG. 9A.

In some embodiments, a relationship between the multibeam elements 210 of the plurality and corresponding multiview pixels (e.g., sets of light valves 208) may be a one-to-one relationship. That is, there may be an equal number of multiview pixels and multibeam elements 210. FIG. 9B explicitly illustrates by way of example the one-to-one relationship where each multiview pixel comprising a different set of light valves 208 is illustrated as surrounded by a dashed line. In other embodiments (not illustrated), the number of multiview pixels 206 and multibeam elements 210 may differ from one another.

In some embodiments, an inter-element distance (e.g., center-to-center distance) between a pair of adjacent multibeam elements 210 of the plurality may be equal to an inter-pixel distance (e.g., a center-to-center distance) between a corresponding adjacent pair of multiview pixels, e.g., represented by light valve sets. For example, as illustrated in FIG. 9A, a center-to-center distance d between the first multibeam element 210a and the second multibeam element 210b is substantially equal to a center-to-center distance D between the first light valve set 208a and the second light valve set 208b. In other embodiments (not illustrated), the relative center-to-center distances of pairs of multibeam elements 210 and corresponding light valve sets may differ, e.g., the multibeam elements 210 may have an inter-element spacing (i.e., center-to-center distance d) that is one of greater than or less than a spacing (i.e., center-to-center distance D) between light valve sets representing multiview pixels.

Further (e.g., as illustrated in FIG. 9A), each multibeam element 210 is configured to provide directional light beams 202 to one and only one multiview pixel, according to some embodiments. In particular, for a given one of the multibeam elements 210, the directional light beams 202 having different principal angular directions corresponding to the different views of the multiview display are substantially confined to a single corresponding multiview pixel, i.e., a single set of light valves 208 corresponding to the multibeam element 210, as illustrated in FIG. 9A. As such, each multibeam element 210 of the multiview backlight 200 provides a corresponding set of directional light beams 202 that has a set of the different principal angular directions corresponding to the different views of the multiview display.

According to various embodiments, the multibeam element 210 may comprise any of a number of different scattering structures configured to scatter or couple out a portion of the guided light 104. For example, the different scattering structures may include, but are not limited to, a diffraction grating, a micro-reflective element, a micro-refractive element, or various combinations thereof. Each of these scattering structures may be an angle-preserving scatterer. In some embodiments, the multibeam element 210 comprising a diffraction grating is configured to diffractively couple out the guided light portion as the plurality of directional light beams 202 having the different principal angular directions. In other embodiments, the multibeam element 210 comprising a micro-reflective element is configured to reflectively couple out the guided light portion as the plurality of directional light beams 202, or the multibeam element 210 comprising a micro-refractive element is configured to couple out the guided light portion as the plurality of directional light beams 202 by or using refraction (i.e., refractively couple out the guided light portion).

Figure 10A:
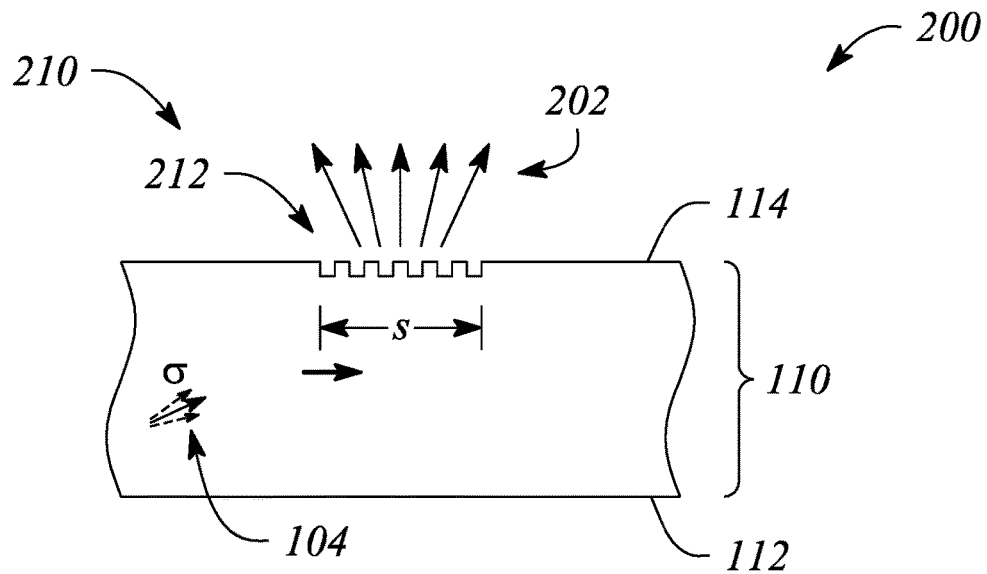
FIG. 10A illustrates a cross sectional view of a portion of a multiview backlight including a multibeam element in an example, according to an embodiment consistent with the principles described herein.
Figure 10B:
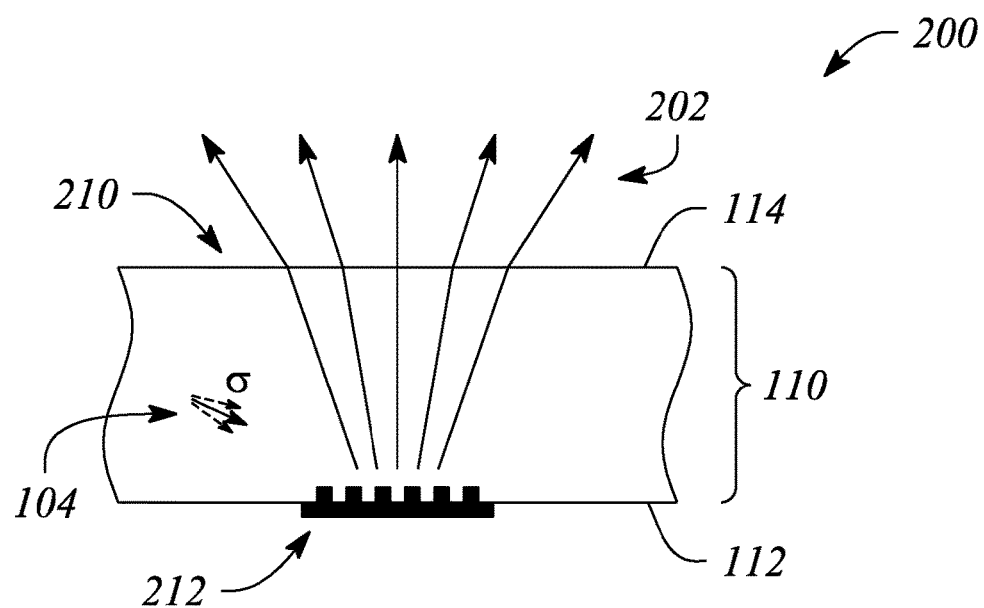
FIG. 10B illustrates a cross sectional view of a portion of a multiview backlight including a multibeam element in an example, according to another embodiment consistent with the principles described herein.

FIG. 10A illustrates a cross sectional view of a portion of a multiview backlight 200 including a multibeam element 210 in an example, according to an embodiment consistent with the principles described herein. FIG. 10B illustrates a cross sectional view of a portion of a multiview backlight 200 including a multibeam element 210 in an example, according to another embodiment consistent with the principles described herein. In particular, FIGS. 10A-10B illustrate the multibeam element 210 of the multiview backlight 200 comprising a diffraction grating 212. The diffraction grating 212 is configured to diffractively couple out a portion of the guided light 104 as the plurality of directional light beams 202. The diffraction grating 212 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 212 may be sub-wavelength (i.e., less than a wavelength of the guided light).

In some embodiments, the diffraction grating 212 of the multibeam element 210 may be located at or adjacent to a surface of the light guide 110. For example, the diffraction grating 212 may be at or adjacent to the second surface 114 of the light guide 110, as illustrated in FIG. 10A. The diffraction grating 212 at light guide second surface 114 may be a transmission mode diffraction grating configured to diffractively couple out the guided light portion through the second surface 114 as the directional light beams 202. In another example, as illustrated in FIG. 10B, the diffraction grating 212 may be located at or adjacent to the first surface 112 of the light guide 110. When located at the first surface 112, the diffraction grating 212 may be a reflection mode diffraction grating. As a reflection mode diffraction grating, the diffraction grating 212 is configured to both diffract the guided light portion and reflect the diffracted guided light portion toward the second surface 114 to exit through the second surface 214 as the diffractively coupled-out diffraction light beams 202. In other embodiments (not illustrated), the diffraction grating may be located between the surfaces of the light guide 110, e.g., as one or both of a transmission mode diffraction grating and a reflection mode diffraction grating.

According to some embodiments, the diffractive features of the diffraction grating 212 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110. In some embodiments, the diffraction grating 212 of the multibeam element 210 is a uniform diffraction grating in which the diffractive feature spacing is substantially constant or unvarying throughout the diffraction grating 212.

In other embodiments, the diffraction grating 212 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 210 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In some embodiments, the multibeam element 210 or equivalently the diffraction grating 212 may comprise a plurality of diffraction gratings. The plurality of diffraction gratings may also be referred to as a plurality of 'sub-gratings' of the diffraction grating 212. The diffraction grating (or sub-grating) plurality may be arranged in a number of different configurations to scatter or diffractively couple out a portion of the guided light 104 as the plurality of directional light beams 202. In particular, the plurality of diffraction gratings of the multibeam element 210 may comprise a first diffraction grating and a second diffraction grating (or equivalently a first sub-grating and a second sub-grating). The first diffraction grating may be configured to provide a first light beam of the plurality of directional light beams 202, while the second diffraction grating may be configured to provide a second light beam of the plurality of directional light beams 202. According to various embodiments, the first and second light beams may have different principal angular directions. Moreover, the plurality of diffraction gratings may comprise a third diffraction grating, a fourth diffraction grating and so on, each diffraction grating being configured to provide other directional light beams 202, according to some embodiments.

Figure 11A:
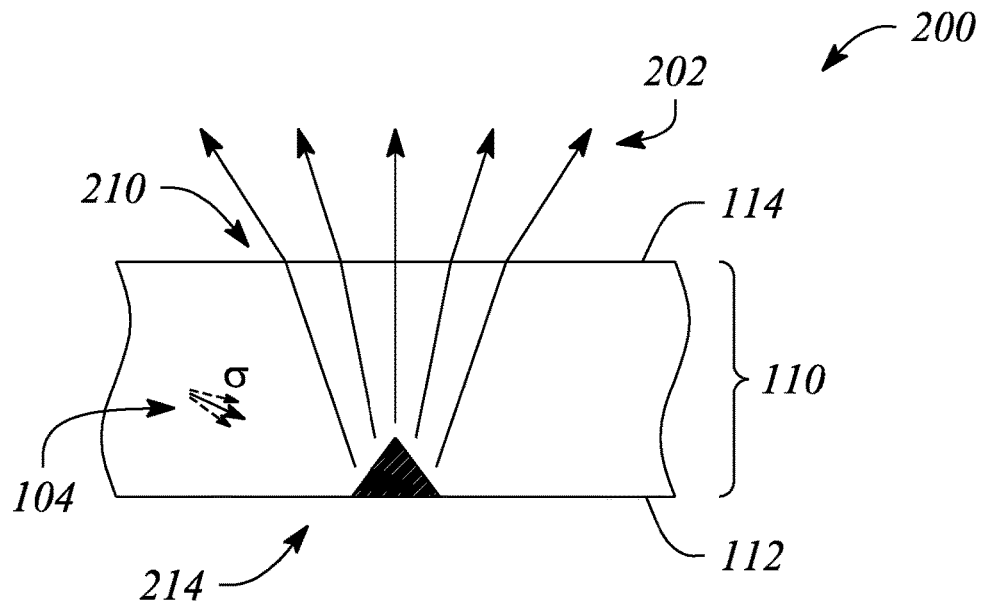
FIG. 11A illustrates a cross sectional view of a portion of a multiview backlight including a multibeam element in an example, according to another embodiment consistent with the principles described herein.
Figure 11B:
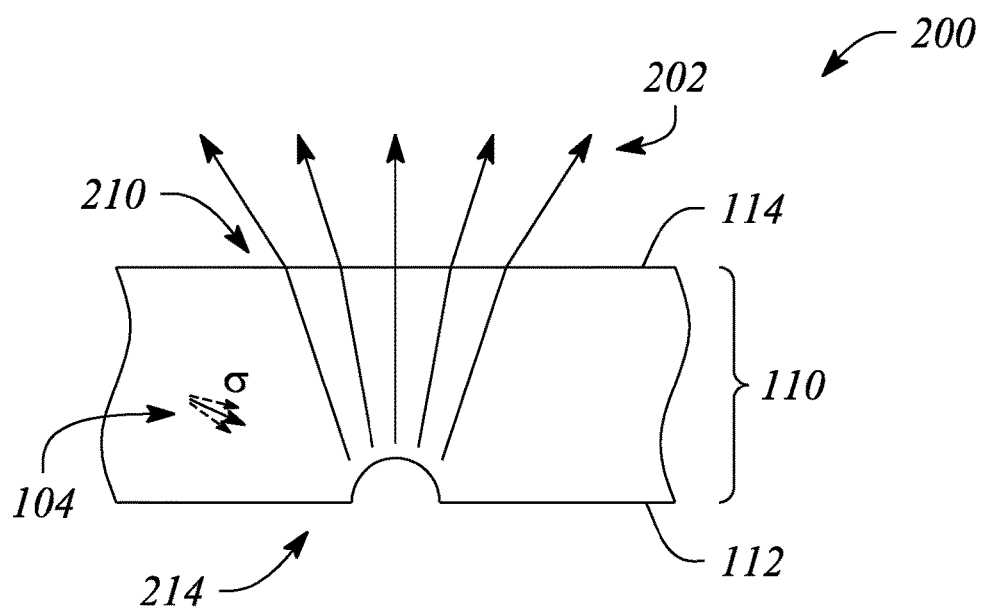
FIG. 11B illustrates a cross sectional view of a portion of a multiview backlight including a multibeam element in an example, according to another embodiment consistent with the principles described herein.

FIG. 11A illustrates a cross sectional view of a portion of a multiview backlight 200 including a multibeam element 210 in an example, according to another embodiment consistent with the principles described herein. FIG. 11B illustrates a cross sectional view of a portion of a multiview backlight 200 including a multibeam element 210 in an example, according to another embodiment consistent with the principles described herein. In particular, FIGS. 11A and 11B illustrate embodiments of the multibeam element 210 comprising a micro-reflective element. Micro-reflective elements used as or in the multibeam element 210 may include, but are not limited to, a reflector that employs a reflective material or layer thereof (e.g., a reflective metal) or a reflector based on total internal reflection (TIR). According to some embodiments (e.g., as illustrated in FIGS. 11A-11B), the multibeam element 210 comprising the micro-reflective element may be located at or adjacent to a surface (e.g., the first surface 112) of the light guide 110. In other embodiments (not illustrated), the micro-reflective element may be located within the light guide 110 between the first and second surfaces 114, 112.

For example, FIG. 11A illustrates the multibeam element 210 comprising a micro-reflective element 214 having reflective facets (e.g., a 'prismatic' micro-reflective element) located adjacent to the first surface 112 of the light guide 110. The facets of the illustrated prismatic micro-reflective element 214 are configured to reflect (i.e., reflectively couple) the portion of the guided light 104 out of the light guide 110. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 11A) or may be surfaces of a prismatic cavity in the first surface 112, according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 11B illustrates the multibeam element 210 comprising a micro-reflective element 214 having a substantially smooth, curved surface such as, but not limited to, a semi-spherical micro-reflective element 214. A specific surface curve of the micro-reflective element 214 may be configured to reflect the guided light portion in different directions depending on a point of incidence on the curved surface with which the guided light 104 makes contact, for example. As illustrated in FIGS. 11A and 11B, the guided light portion that is reflectively coupled out of the light guide 110 exits or is emitted from the second surface 114, by way of example and not limitation. As with the prismatic micro-reflective element 214 in FIG. 11A, the micro-reflective element 214 in FIG. 11B may be either a reflective material within the light guide 110 or a cavity (e.g., a semi-circular cavity) formed in the first surface 112, as illustrated in FIG. 11B by way of example and not limitation.

Figure 12:
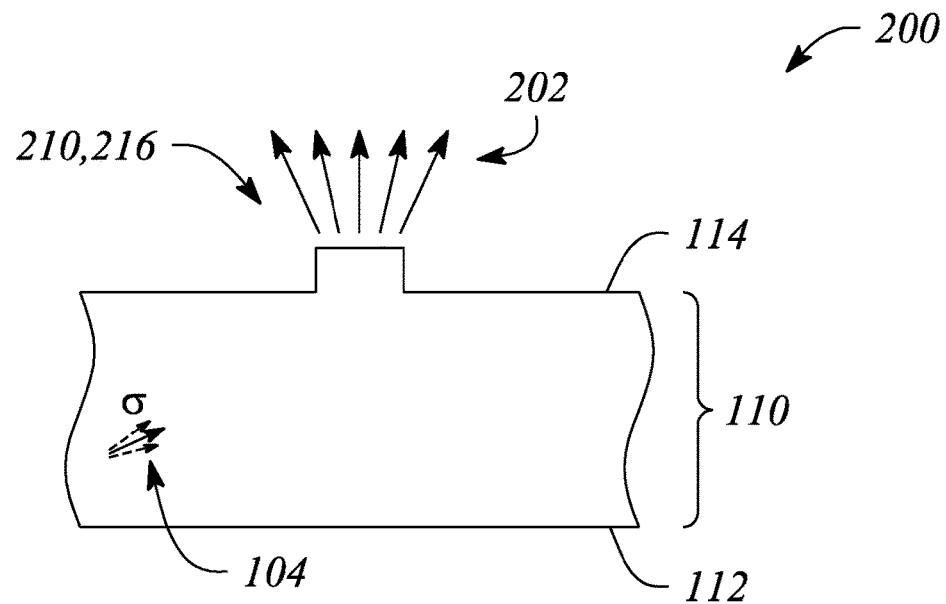
FIG. 12 illustrates a cross sectional view of a portion of a multiview backlight including a multibeam element in an example, according to yet another embodiment consistent with the principles described herein.

FIG. 12 illustrates a cross sectional view of a portion of a multiview backlight 200 including a multibeam element 210 in an example, according to yet another embodiment consistent with the principles described herein. In particular, FIG. 12 illustrates a multibeam element 210 comprising a micro-refractive element 216. According to various embodiments, the micro-refractive element 216 is configured to refractively couple out a portion of the guided light 104 from the light guide 110. That is, the micro-refractive element 216 is configured to employ refraction (e.g., as opposed to diffraction or reflection) to couple out the guided light portion from the light guide 110 as the directional light beams 202, as illustrated in FIG. 12. The micro-refractive element 216 may have various shapes including, but not limited to, a semi-spherical shape, a rectangular shape or a prismatic shape (i.e., a shape having sloped facets). According to various embodiments, the micro-refractive element 216 may extend or protrude out of a surface (e.g., the second surface 114) of the light guide 110, as illustrated, or may be a cavity in the surface (not illustrated). Further, the micro-refractive element 216 may comprise a material of the light guide 110, in some embodiments. In other embodiments, the micro-refractive element 216 may comprise another material adjacent to, and in some examples, in contact with the light guide surface.

Figure 13:
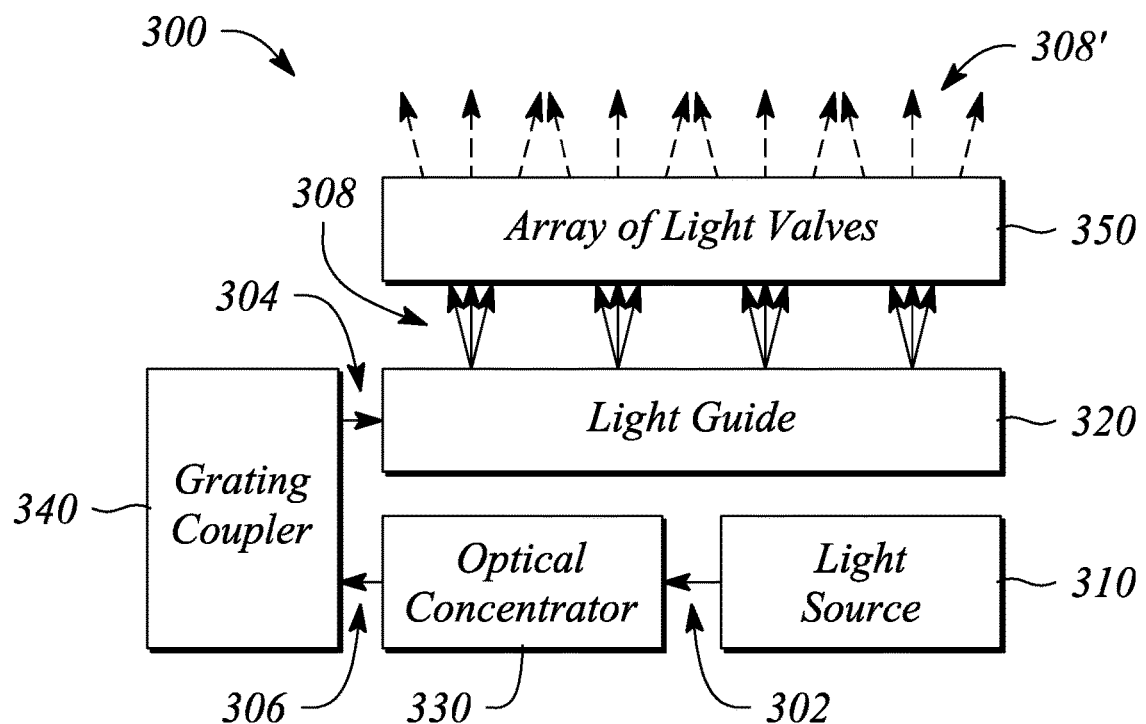
FIG. 13 illustrates a block diagram of a grating-coupled display system in an example, according to an embodiment consistent with the principles described herein.

FIG. 13 illustrates a block diagram of a grating-coupled display system 300 in an example, according to an embodiment consistent with the principles described herein. The grating-coupled display system 300 illustrated in FIG. 13 comprises a light source 310 configured to provide light 302 in a first direction. In some embodiments, the light source 310 may be substantially similar to the light source 106 described above with respect to the grating-coupled light guide 100. For example, the light 302 provided by the light source 310 may be unconcentrated or uncollimated light. Further, the light 302 provided in first direction may include a central ray in a z-direction, as illustrated in FIGS. 3A-3B, above.

The grating-coupled display system 300 illustrated in FIG. 13 further comprises a light guide 320. The light guide 320 is configured to guide light as guided light 304. The guided light 304 has or is guided in a second direction within the light guide 320. The second direction is orthogonal to the first direction, according to various embodiments. In some embodiments, the light guide 320 may be substantially similar to the light guide 110 of the grating-coupled light guide 100, described above. For example, the light guide 320 may be a plate light guide. The second direction may be in an x-direction, for example, as illustrated above in FIGS. 3A-3B.

In FIG. 13, the grating-coupled display system 300 further comprises an optical concentrator 330, according to various embodiments. The optical concentrator 330 is configured to concentrate the light 302 received from the light source 310 to provide concentrated light 306. In some embodiments, the optical concentrator 330 may be substantially similar to the optical concentrator 120 of the above-described grating-coupled light guide 100. In particular, according to various embodiments, the optical concentrator 330 may comprise one or more of a tapered collimator, a catadioptric collimator, and a reflective turning collimator, as described above with respect to the optical concentrator 120.

As illustrated in FIG. 13, the grating-coupled display system 300 further comprises a grating coupler 340. The grating coupler 340 is configured to diffractively redirect the concentrated light 306 into the light guide 320 as the guided light 304 having the second direction. In some embodiments, the grating coupler 340 may be substantially similar to the grating coupler 130 described above with respect to the grating-coupled light guide 100. In particular, in some embodiments, the grating coupler 340 may comprise one or both of a transmission mode diffraction grating at a surface of the light guide 320 adjacent to the light source 310 and a reflection mode diffraction grating at a surface of the light guide 320 opposite a light guide surface adjacent to the light source 310. According to various embodiments, characteristics of both the optical concentrator 330 and grating coupler 340 are configured to cooperatively determine a non-zero propagation angle and a predetermined spread angle of the guided light within the light guide.

The grating-coupled display system 300 illustrated in FIG. 13 further comprises an array of light valves 350. The array of light valves 350 is configured to modulate light 308 emitted from the light guide as a displayed image. According to some embodiments, the array of light valves 350 may be substantially similar to the plurality of light valves 208 of the above-described multiview backlight 200. For example, light valves 350 of the light valve array may include, but are not limited to, one or more of liquid crystal light valves, electrophoretic light valves, and light valves based on electrowetting. Modulated emitted light 308' (e.g., directional light beams) is illustrated as dashed arrows in FIG. 13 to emphasize modulation by the light valve array.

In some embodiments (not illustrated), the grating-coupled display system 300 further comprises an array of multibeam elements optically coupled to the light guide 320. A multibeam element of the multibeam element array is configured to scatter from the light guide 320 a portion of the guided light 304 as a plurality of directional light beams. Directional light beams of the directional light beam plurality have different principal angular directions from one another, according to various embodiments. In these embodiments, the light emitted by or from the light guide 320 and modulated by the array of light valves 350 comprises the plurality of directional light beams.

In some embodiments, the multibeam element of the multibeam element array may be substantially similar to the multibeam element 210 of the multiview backlight 200, described above. In particular, the multibeam element may comprise one or more of a diffraction grating, a micro-reflective element, and a micro-refractive element. Further, a size of the multibeam element may be greater than one half of a size of a light valve of the light valve array and less than twice the light valve size, in some embodiments. In some embodiments, the different principal angular directions of the directional light beams may correspond to respective view directions of a plurality of different views of a multiview display. Thus, the grating-coupled display system 300 may be a multiview display and the displayed image may represent a multiview image, in some embodiments.

Figure 14:
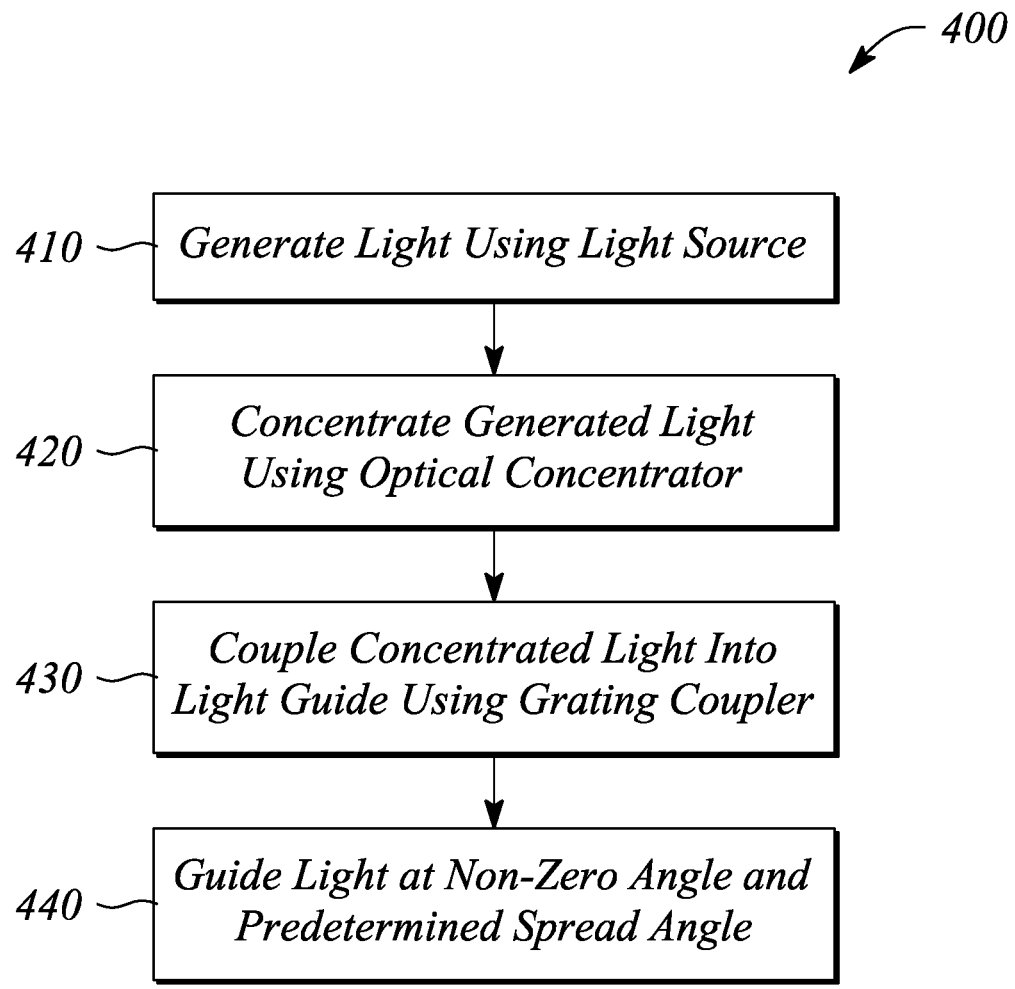
FIG. 14 illustrates a flow chart of a method of coupling light into a light guide in an example, according to an embodiment consistent with the principles described herein.

According to embodiments and examples of the principles described herein, a method of coupling light into a light guide is provided. FIG. 14 illustrates a flow chart of a method 400 of coupling light into a light guide in an example, according to an embodiment consistent with the principles described herein. As illustrated in FIG. 14, the method 400 of coupling light into a light guide comprises generating 410 light using a light source. In some embodiments, the light source is an uncollimated light source and the generated 410 light is substantially concentrated or collimated light. For example, the light source used in generating 410 light may approximate a point source. In some embodiments, the light source used to generate 410 light may be substantially similar to the light source 106 described above with respect to the grating-coupled light guide 100.

As illustrated in FIG. 14, the method 400 of coupling light into a plate light guide further comprises concentrating 420 the light from the light source using an optical concentrator. The concentrating 420 light by the optical concentrator produces concentrated light. According to some embodiments, the optical concentrator used in concentrating 420 light may be substantially similar to the optical concentrator 120 of the above-described grating-coupled light guide 100. For example, the optical concentrator may comprise one or more of a tapered collimator, a catadioptric collimator, and a reflective turning collimator. In another example, the optical concentrator comprises a concentrating lens.

The method 400 of coupling light into a plate light guide illustrated in FIG. 14 further comprises coupling 430 the concentrated light into the light guide using a grating coupler and guiding 440 the coupled light in the light guide at a non-zero propagation angle as guided light. According to various embodiments, the guided light has a first spread angle and a second spread angle, the second spread angle being in a direction orthogonal to the first spread angle. For example, the guided light may include a propagating light beam directed at the non-zero propagation angle by the grating coupler that has a predetermined first spread angle in a plane perpendicular to a surface of the light guide and a predetermined second spread angle in a plane substantially parallel to surface of the light guide. The non-zero propagation angle, the first spread angle, and the second spread angle of the guided light within the light guide are determined by characteristics of both of the optical concentrator and the grating coupler, according to various embodiments.

In some examples, the grating coupler used in coupling 430 the light may be substantially similar to the grating coupler 130 described above with respect to the grating-coupled light guide 100. In particular, in some examples, the grating coupler includes a transmissive grating at a surface of the light guide adjacent to the light source. In some examples, the grating coupler includes a reflective grating at a surface of the light guide opposite the light source-adjacent surface of the plate light guide.

In some embodiment, the method 400 of coupling light into a light guide is used in the operation of an electronic display to display an image or similar information. In particular, according to some examples (not illustrated), the method 400 of coupling light into a light guide further comprises scattering out a portion of the guided light from the light guide using a multibeam element that is optically coupled to the light guide to produce a plurality of directional light beams having different principal angular directions from one another. In some embodiments, the multibeam element may be substantially similar to the multibeam element 210 of the multiview backlight 200, as described above. Further, in some embodiments (also not illustrated), the method 400 of coupling light into a light guide further comprises modulating the plurality of directional light beams using a corresponding plurality of light valves, the modulated light beams forming pixels of a displayed image. For example, the displayed image may be a multiview image and the directional light beams may have directions corresponding to different view directions of the multiview image. Further, the light valves may include liquid crystal light valves. In another example, the light valves may be another type of light valve including, but not limited to, an electrowetting light valve or an electrophoretic light valve.

Thus, there have been described examples of a grating-coupled light guide, a grating-coupled display system, and a method of coupling light into a light guide that employ a grating coupler and a light concentrator to produce guided light propagating at a non-zero propagation angle and having a predetermined spread angle. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A grating-coupled light guide comprising:
   a light guide configured to guide light;
   an optical concentrator configured to concentrate light from a light source to provide concentrated light;
   a grating coupler at an input of the light guide, the grating coupler configured to diffractively redirect the concentrated light into the light guide at a non-zero propagation angle as guided light having a first spread angle and a second spread angle; and
   a multibeam element configured to scatter from the light guide a portion of the guided light as a plurality of directional light beams, directional light beams of the directional light beam plurality having different principal angular directions from one another,
   wherein characteristics of the optical concentrator and grating coupler are configured in combination to determine the non-zero propagation angle, the first spread angle, and the second spread angle of the guided light within the light guide, the first spread angle being orthogonal to the second spread angle, and
   wherein a size of the multibeam element is greater than one half of a size of a light valve configured to modulate the directional light beams and less than twice the light valve size.

2. The grating-coupled light guide of claim 1, wherein the optical concentrator comprises freeform optics configured to reduce a spread angle of the light from the light source and to concentrate the light in an area corresponding to an area occupied by the grating coupler.

3. The grating-coupled light guide of claim 1, wherein the optical concentrator comprises a tapered collimator.

4. The grating-coupled light guide of claim 1, wherein the optical concentrator comprises catadioptric collimator.

5. The grating-coupled light guide of claim 1, wherein the optical concentrator comprises a reflective turning collimator.

6. The grating-coupled light guide of claim 1, wherein the grating coupler is a transmissive grating coupler comprising a transmission mode diffraction grating at a surface of the light guide adjacent to the light source, the transmission mode diffraction grating being configured to diffractively redirect light transmitted through the diffraction grating.

7. The grating-coupled light guide of claim 1, wherein the grating coupler is a reflective grating coupler comprising a reflection mode diffraction grating at a surface of the light guide opposite a light guide surface adjacent to the light source, the reflection mode diffraction grating being configured to diffractively redirect light into the light guide using reflective diffraction.

8. The grating-coupled light guide of claim 1, wherein a cone angle of light provided by the light source is greater than about sixty (60) degrees, the optical concentrator being configured to reduce the cone angle of the light provided by the light source to provide the concentrated light.

9. The grating-coupled light guide of claim 1, wherein the multibeam element comprises one or more of:
   a diffraction grating configured to diffractively scatter the portion of the guided light as the plurality of directional light beams;
   a micro-reflective element being configured to reflectively scatter the portion of the guided light as the plurality of directional light beams; and
   a micro-refractive element configured to refractively scatter the portion of the guided light as the plurality of directional light beams.

10. The grating-coupled light guide of claim 1, wherein the different principal angular directions of the directional light beams correspond to respective view directions of a plurality of different views of a multiview display.

11. A grating-coupled display system comprising:
    a light source configured to provide light in a first direction;
    a light guide to guide light as guided light having a second direction orthogonal to the first direction;
    an optical concentrator configured concentrate the light received from the light source to provide concentrated light;
    a grating coupler configured to diffractively redirect the concentrated light into the light guide as the guided light having the second direction;
    an array of multibeam elements optically coupled to the light guide, a multibeam element of the multibeam element array being configured to scatter from the light guide a portion of the guided light as a plurality of directional light beams, the directional light beams of the directional light beam plurality having different principal angular directions from one another; and
    an array of light valves configured to modulate light emitted from the light guide comprising the plurality of directional light beams and provide a displayed image,
    wherein characteristics of both the optical concentrator and grating coupler are configured to cooperatively determine a non-zero propagation angle and a predetermined spread angle of the guided light within the light guide, and
    wherein a size of the multibeam element is greater than one half of a size of a light valve of the light valve array and less than twice the light valve size.

12. The grating-coupled display system of claim 11, wherein the optical concentrator comprises one or more of a tapered collimator, a catadioptric collimator, and a reflective turning collimator.

13. The grating-coupled display system of claim 11, wherein the grating coupler comprises one or both of a transmission mode diffraction grating at a surface of the light guide adjacent to the light source and a reflection mode diffraction grating at a surface of the light guide opposite a light guide surface adjacent to the light source.

14. The grating-coupled display system of claim 11, wherein a multibeam element of the multibeam element array comprises one or more of a diffraction grating, a micro-reflective element, and a micro-refractive element.

15. The grating-coupled display system of claim 14, wherein the diffraction grating comprises a plurality of diffraction gratings.

16. The grating-coupled display system of claim 11, wherein the different principal angular directions of the directional light beams correspond to respective view directions of a plurality of different views of a multiview display, the grating-coupled display system being the multiview display and the displayed image representing a multiview image.

17. A method of coupling light into a light guide, the method comprising:
generating light using a light source;
concentrating the light from the light source using an optical concentrator to produce concentrated light;
coupling the concentrated light into the light guide using a grating coupler;
guiding the coupled light in the light guide at a non-zero propagation angle as guided light having a first spread angle and a second spread angle, the second spread angle being in a direction orthogonal to the first spread angle;
scattering out a portion of the guided light from the light guide using a multibeam element that is optically coupled to the light guide to produce a plurality of directional light beams having different principal angular directions from one another; and
modulating the plurality of directional light beams using a corresponding plurality of light valves,
wherein the non-zero propagation angle, the first spread angle, and the second spread angle of the guided light within the light guide are determined by characteristics of both of the optical concentrator and the grating coupler, and
wherein a size of the multibeam element is greater than one half of a size of a light valve of the plurality of light valves and less than twice the light valve size.

18. The method of coupling light into a light guide of claim 17, wherein the optical concentrator comprises one or more of a tapered collimator, a catadioptric collimator, and a reflective turning collimator.

19. The method of coupling light into a light guide of claim 17, wherein modulated light beams form pixels of a displayed image.

* * * * *